April 12, 1960　　　　R. N. KNOSP　　　　2,932,088
PROGRAMING APPARATUS FOR MACHINE TOOLS
Filed May 1, 1957　　　　　　　　　　　　　10 Sheets-Sheet 2
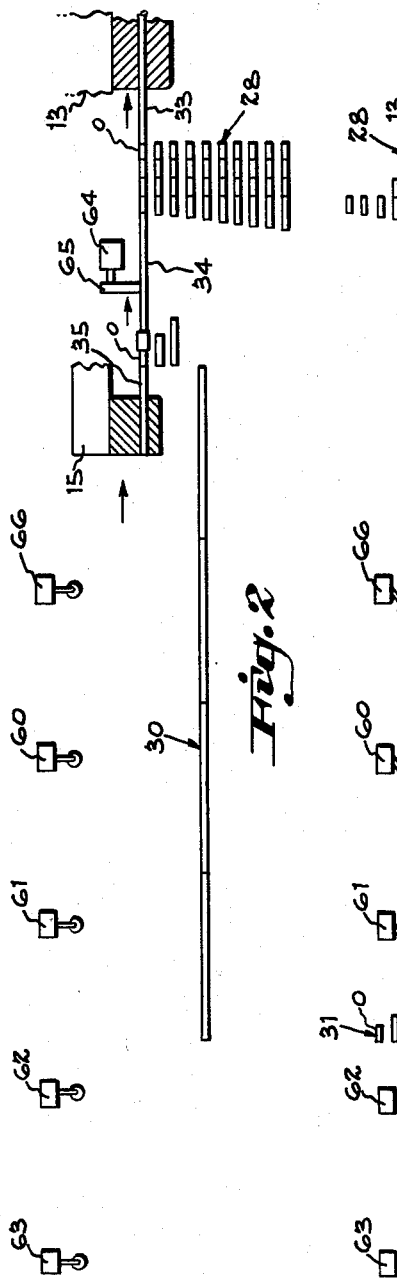
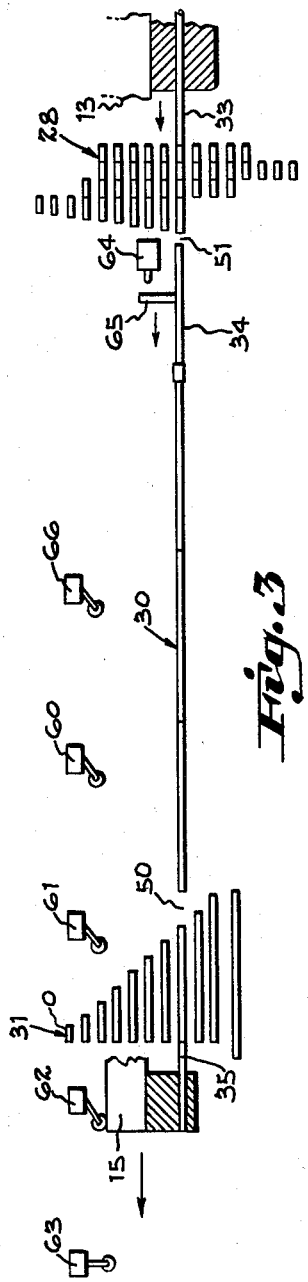
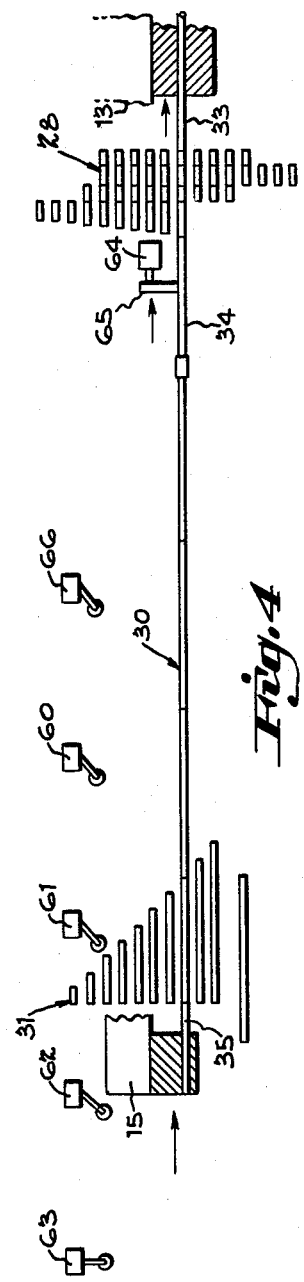
INVENTOR.
Robert N. Knosp.
BY
Wood, Herron & Evans,
ATTORNEYS.

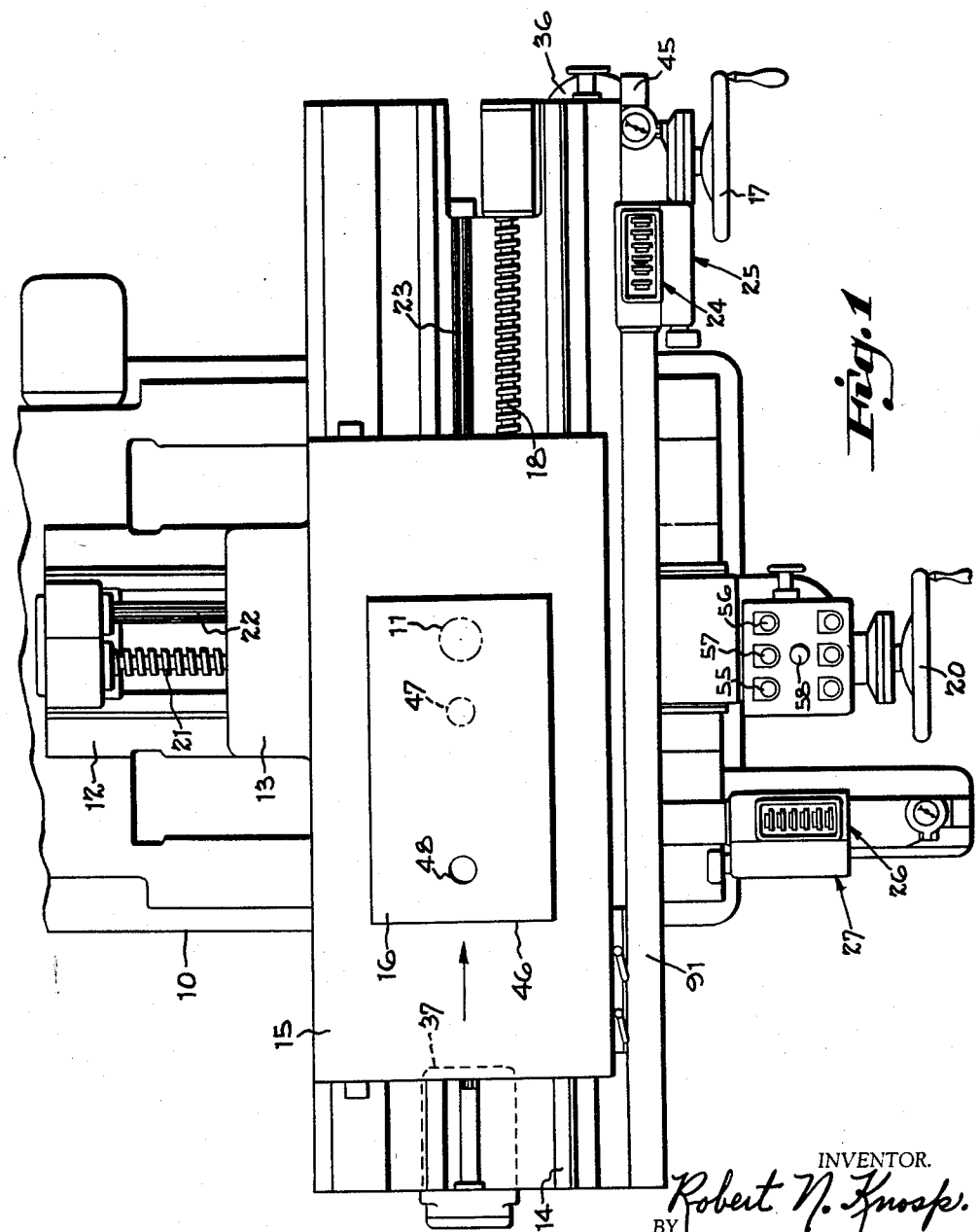

April 12, 1960

R. N. KNOSP 2,932,088

PROGRAMING APPARATUS FOR MACHINE TOOLS

Filed May 1, 1957

INVENTOR.
Robert N. Knosp.
BY
Wood, Herron & Evans.
ATTORNEYS.

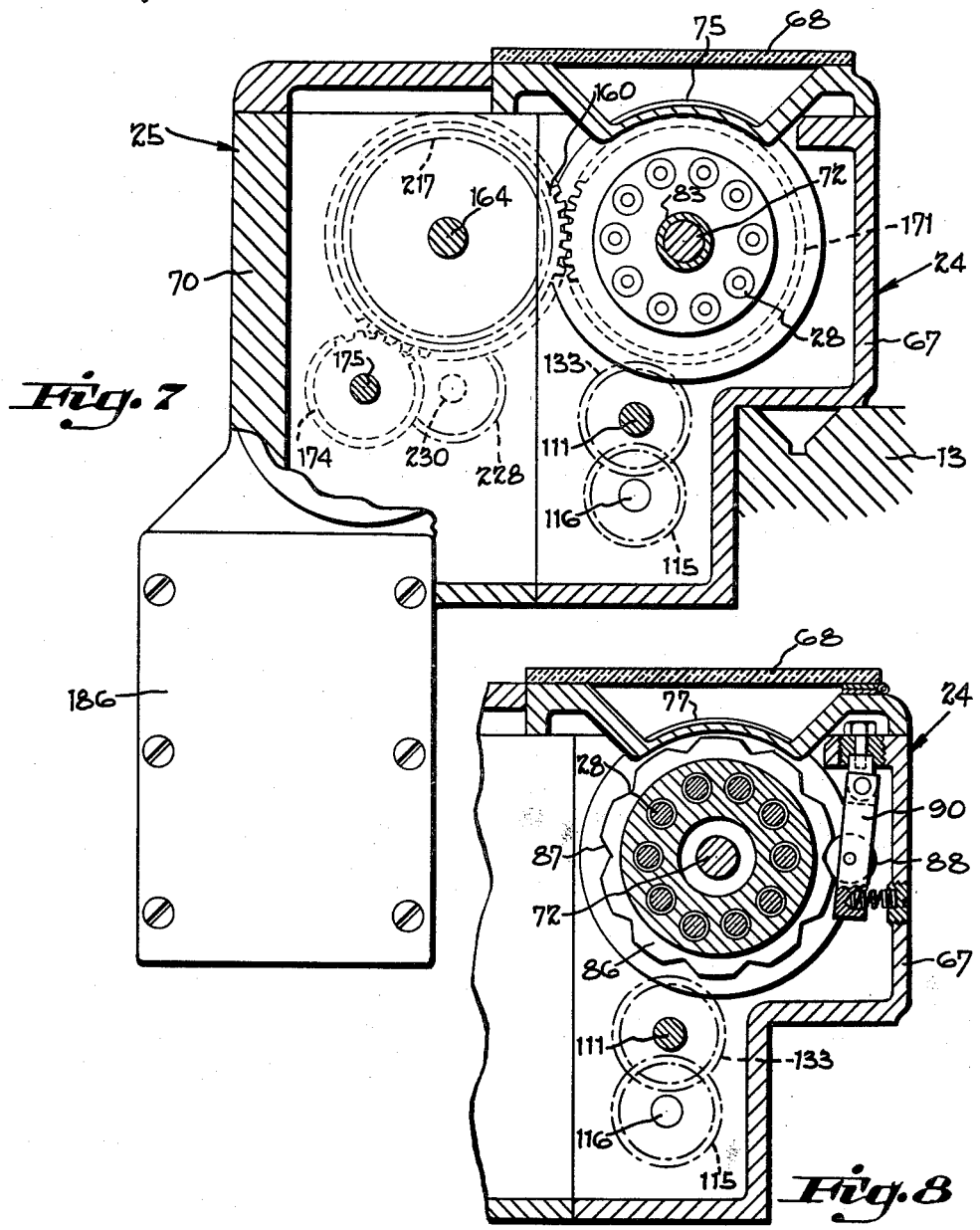

April 12, 1960 R. N. KNOSP 2,932,088
PROGRAMING APPARATUS FOR MACHINE TOOLS
Filed May 1, 1957 10 Sheets-Sheet 5

INVENTOR.
Robert N. Knosp.
BY Wood, Herron & Evans.
ATTORNEYS.

April 12, 1960
R. N. KNOSP
2,932,088
PROGRAMING APPARATUS FOR MACHINE TOOLS
Filed May 1, 1957
10 Sheets-Sheet 6
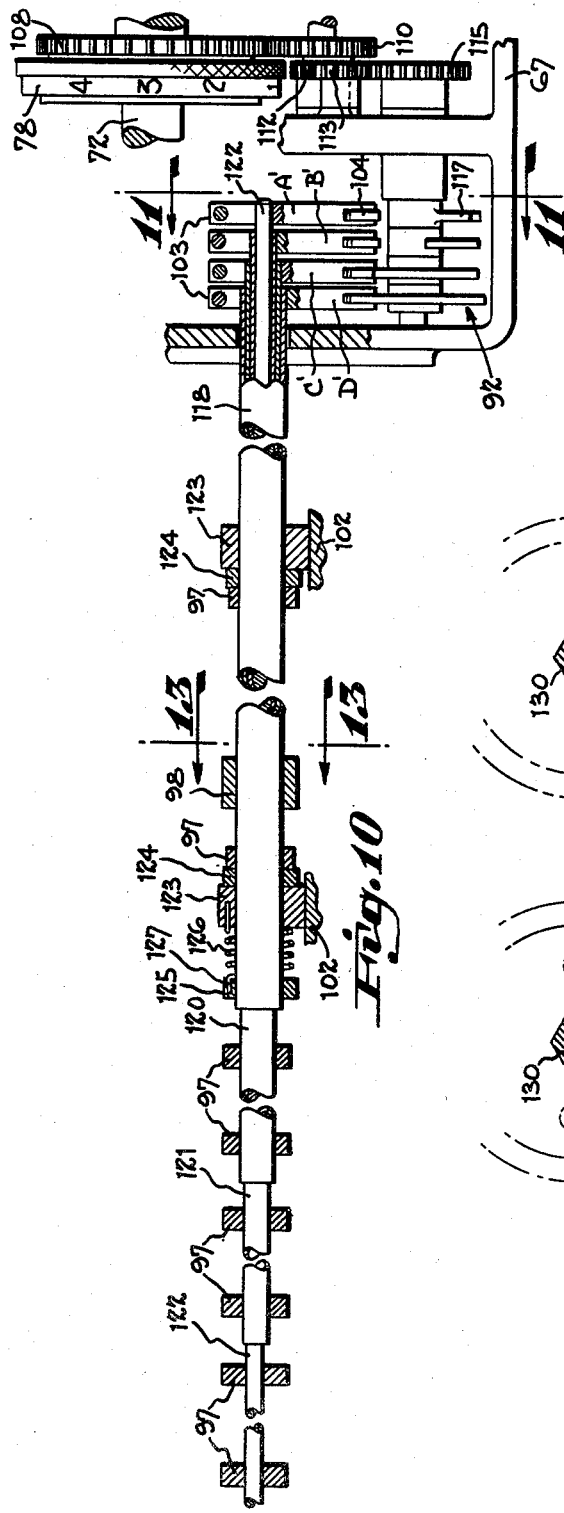
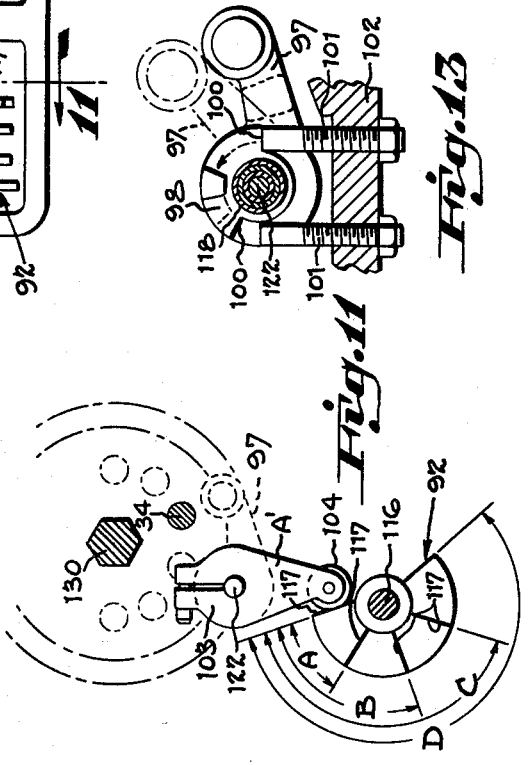
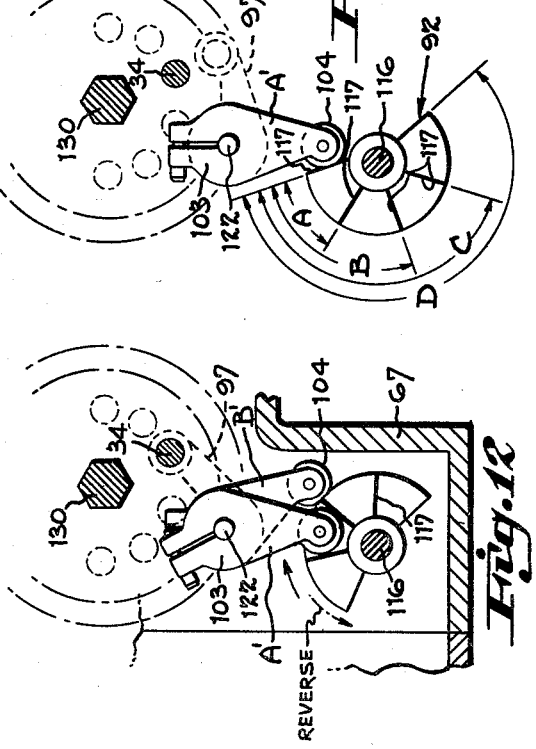
INVENTOR.
Robert N. Knosp.
BY
Wood, Herron & Evans.
ATTORNEYS.

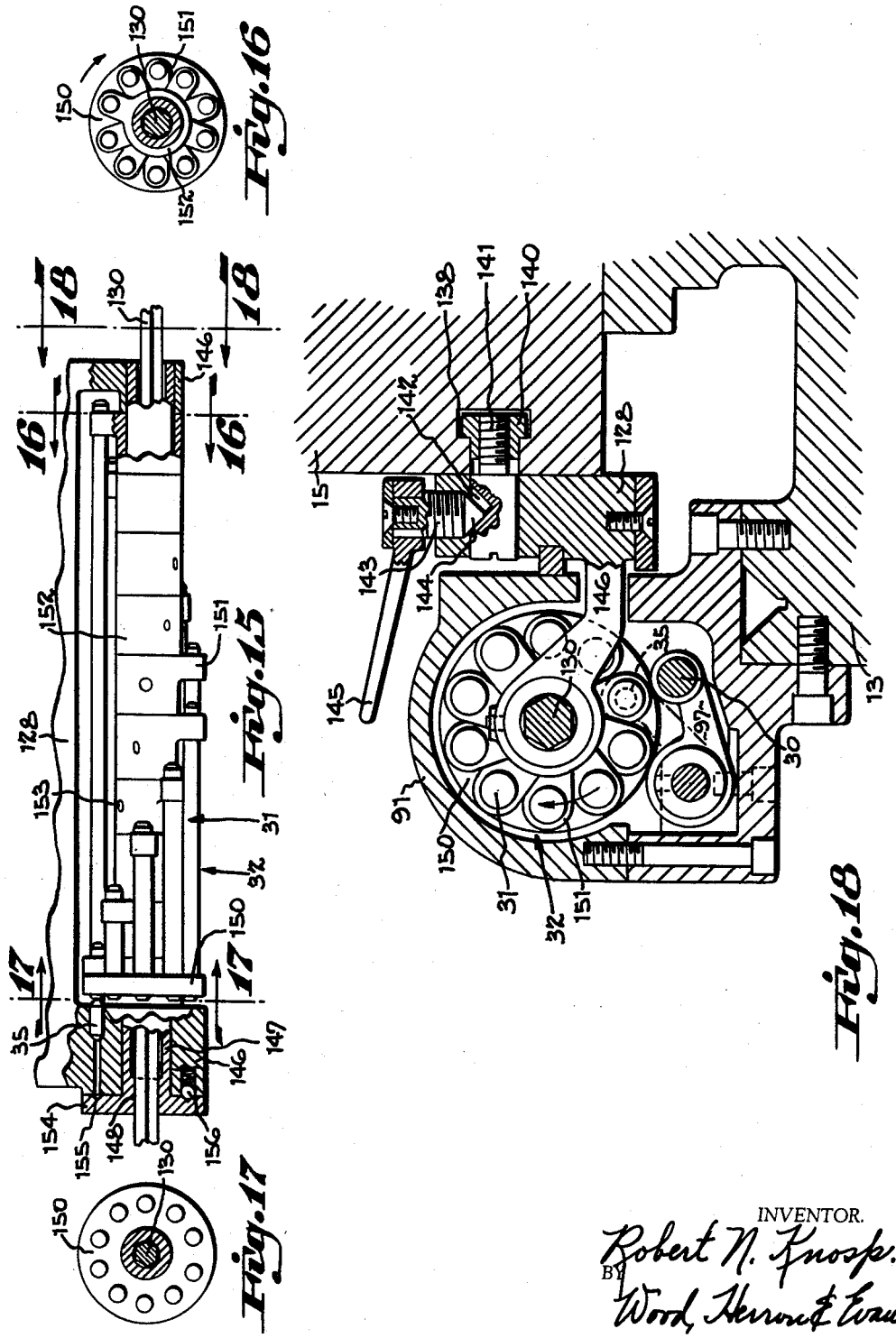

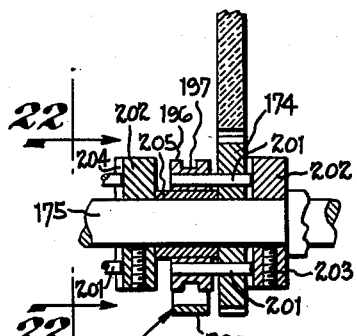
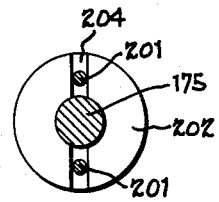
Fig. 21
Fig. 22
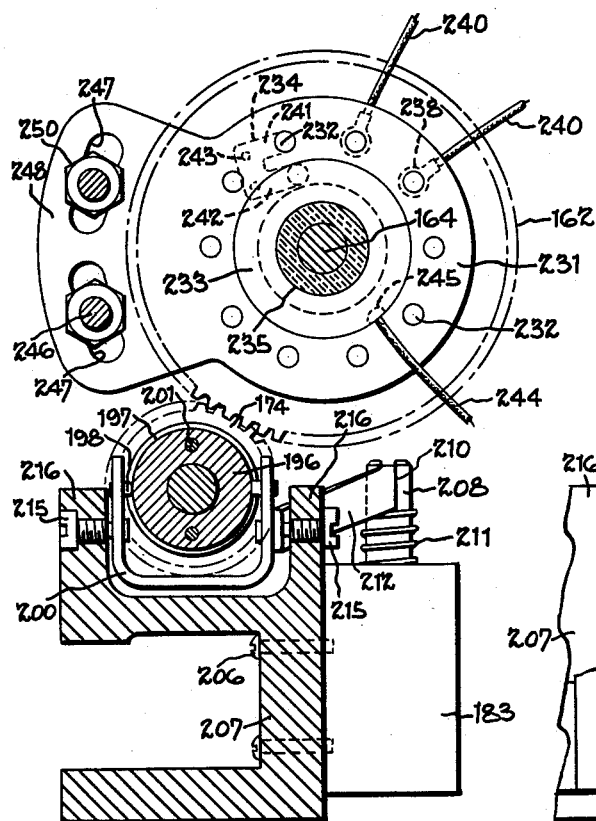
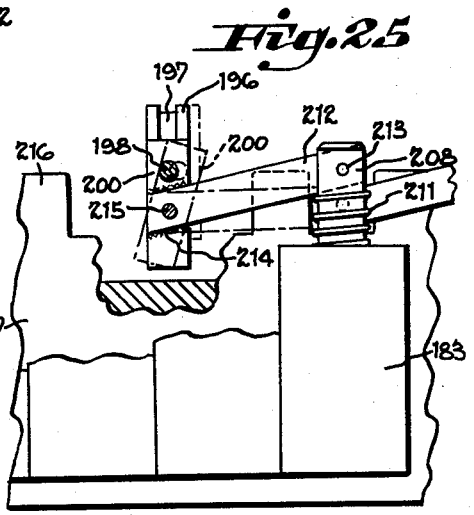
Fig. 24
Fig. 25
INVENTOR.
Robert N. Knosp.
BY Wood, Herron & Evans.
ATTORNEYS.

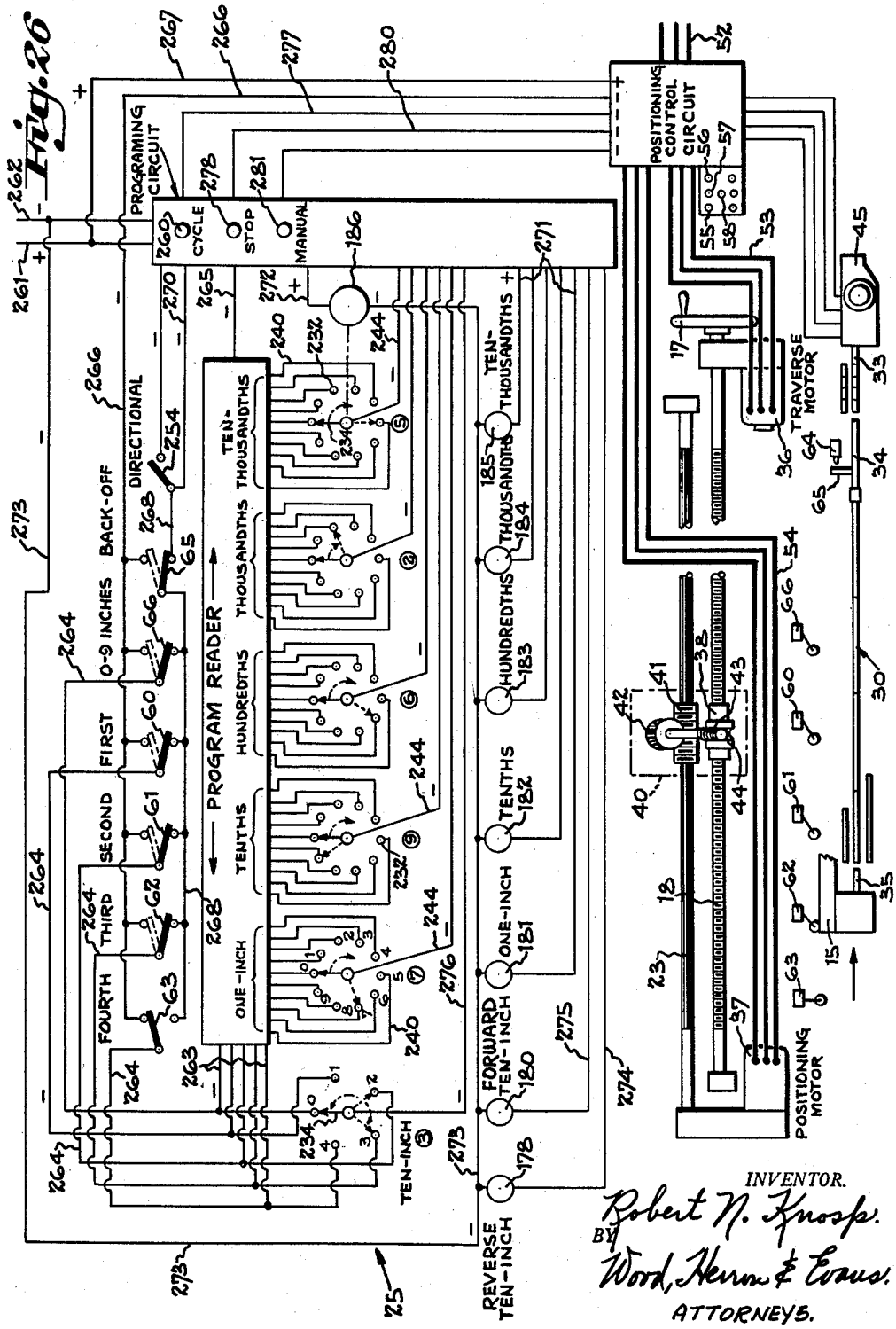

United States Patent Office 2,932,088
Patented Apr. 12, 1960

2,932,088

PROGRAMING APPARATUS FOR MACHINE TOOLS

Robert N. Knosp, Ludlow, Ky., assignor to The Fosdick Machine Tool Company, Cincinnati, Ohio, a corporation of Ohio Application May 1, 1957, Serial No. 656,322

20 Claims. (Cl. 33—125)

This invention relates to a programing apparatus which regulates the motions and positions of a shiftable machine tool element so as to provide a sequence of machining operations at preselected locations on a workpiece in response to coded record media which is fed into the programing apparatus.

A primary objective of the invention has been to provide for the rapid and precise positioning of the shiftable machine element, such as a table or slide, utilizing selective lineal measuring rods or gauges which are shifted in response to the programing apparatus into alignment with one another, such that the additive length of the measuring rods, establishes precisely the preselected locations of the shiftable element.

In order to clearly disclose the principles of the invention, the programing apparatus is disclosed in relation to a jig boring machine which is utilized in the precise centering and machining of holes. The conventional jig boring machine is intended primarily for the boring of jigs and the like, the hole centers being located with an exceptionally high degree of precision. The jig boring machine ordinarily is not used in production work since each hole is located by gauge rods which are placed in the machine by hand, often in combination with adjustable micrometer gauges. The setting up and adjustment of the machine in this manner requires the services of a skilled machinist and consumes a great deal of time.

In general, a conventional jig boring machine comprises a bed having a vertical column having a rotating tool spindle which is shiftable along a vertical axis relative to the bed. A work table is slidably mounted upon a cross slide or saddle for longitudinal motion relative to the saddle, and the saddle is shiftable transversely with respect to the bed of the machine. The work, which is clamped to the table, is located relative to the spindle by the coordinated transverse and longitudinal movements of the saddle and table. The conventional measuring rods, referred to above, are utilized for positioning the saddle transversely and for positioning the table longitudinally.

Prior to the present invention, the applicants developed a dial-operated apparatus for locating the saddle and table of the jig boring machine, as disclosed in the co-pending application of Robert N. Knosp et al., Serial No. 485,851. The programing apparatus is intended particularly for operating the dials of the measuring apparatus, thereby to provide automatic operation of the machine.

Described briefly, the dial-operated apparatus utilizes one group of measuring rods or gauges graduated in lineal multiples of ten inches, a second group graduated in increments of one-inch, and a third group graduated in decimal increments. The decimal rods comprise four sets, each set having graduated lengths in the order of tenths, hundredths, thousandths, and ten-thousandths of an inch. A ten-inch dial is arranged to select the ten-inch rods, a one-inch dial provides selection of the one-inch rods, and an individual dial shifts each set of decimal rods. There is thus provided a series of six dials, all of which are located in a dial housing on a common axis of rotation, the dials having digit graduations to provide direct reading of the selected dimension. The dials shift their respective measuring rods to active measuring position as the dials are rotated to bring their graduations to a reading position.

In its application to a jig boring machine, one dial housing is mounted relative to the table for governing the table position and a second dial housing is mounted relative to the saddle for governing the saddle position. In locating a hole center, the two sets of dials are rotated to the desired setting, thus providing the transverse and longitudinal coordinates for locating the hole center. This measuring apparatus provides the same order of precision as the conventional measuring rods which must be selected and adjusted by hand.

The dial-controlled measuring apparatus of the co-pending application is intended particularly to be used in combination with the automatic positioning apparatus disclosed in Patent No. 2,674,706 to Robert N. Knosp et al. In general, the positioning apparatus of the patent includes a control system having a spring-loaded feeler rod which governs the operation of a traverse motor and positioning motor. The traverse motor shifts the table toward the left or right at a rapid traverse rate, and the positioning motor shifts the table at a slow positioning rate toward the right to a final position, at which point the feeler rod decommissions the motor and stops the table precisely at its final position. To operate this apparatus, the traverse motor is energized by manual switches to shift the table to the left away from the measuring rod housing, the dials are rotated by hand to the selected dimension, then the positioning cycle is initiated by depressing a manual cycle switch. The rods, which are shifted to measuring position, reside in alignment between a table abutment and the feeler rod; hence, the table causes the measuring rods to be shifted into endwise contact with the feeler rod to stop the table at final position in response to pressure imposed upon the feeler rod.

A further objective of the present invention has been to provide a programing apparatus which regulates in sequence the positioning of the table and saddle and the selection of the dimensions, such that the operator simply locates the workpiece on the table and initiates a cycle. The programing apparatus thereafter selects the dimensions and causes the table to be positioned automatically to the selected positions. Thus, the coded record may contain the dimensions for a complete pattern of holes for a given workpiece, causing the programing apparatus to carry out the entire series of operations for each workpiece which is clamped upon the table so as to provide exact duplicates. The apparatus accordingly carries forward the concept of dial selection and precise automatic positioning and provides coordinated cycling in a rapid automatic manner. As a result, one or more machines may be operated by an unskilled worker in the rapid production of precision parts which may require boring of a complex pattern of holes.

Described briefly, the programing apparatus comprises a dial selector mechanism which includes a set of dial-driving gears arranged to rotate the dials of the measuring apparatus to preselected positions. Rotation of the gears in turn is regulated by respective electrical selector devices which are actuated by the gears and which stop the gears when the dial reaches a selected digit graduation, with the corresponding measuring rod shifted to measuring position. The dials of the measuring apparatus are also referred to as "matrix members" and the electrical selector devices are referred to as "emitters."

The programming apparatus includes a reader or signal generator which scans the printed record, such as a punched card having patterns of holes, each pattern representing a preselected dimension. The signals from the reader are fed into a program circuit which provides controlled cyclic operation. The program circuit is also interconnected with the circuit of the positioning apparatus to initiate an automatic positioning cycle in sequence with the dial selections.

The cycles of the programming apparatus, in the present disclosure, are initiated manually by depressing a switch. When the switch is depressed, the program circuit signals the positioning apparatus, which in turn traverses the table to the left a sufficient distance to permit insertion to the preselected measuring rods to their measuring position. This back-off position is regulated by a series of stationing switches which are energized by the circuit in accordance with the dimension signalled by the reader. After the table is backed off, the program circuit rotates the dial driving gears, causing the gears to rotate the dials or matrix members from random stationary positions forwardly to their selected positions and to actuate their electrical selector devices. These devices are electrically interconnected with the program circuit according to the selected digits, so as to signal the circuit when the device finds the digit which is called for by the reader. Electrically operated clutch devices, one for each dial driving gear, are energized by the program circuit to stop each gear when it finds the selected digit.

After all the dials are set (and the corresponding measuring rods shifted to measuring position), the program circuit again signals the positioning apparatus and this time causes an automatic positioning cycle to be initiated. The positioning apparatus carries out its own cycle once it receives the signal and thereby shifts the table toward the right to its final position with the feeler rod depressed.

It will be understood that a similar cycle is executed by the saddle, such that the location of the hole is determined by the combined positions of the table and saddle. The spindle is now set in motion and fed downwardly to perform the boring operation at the preselected point.

After the boring operation is completed, and the spindle is retracted from the work, reader signals for the next dimension and the operator again depresses the cycle switch to repeat the same cyclic steps for the next hole location. The programming apparatus precisely duplicates any pattern of holes whether simple or complex by following to the fourth decimal place the coded dimension of the record media, and accordingly, makes feasible the production of duplicate parts in a rapid efficient manner, taking advantage of the high degree of efficiency which is provided by the dial-operated measuring apparatus and positioning apparatus.

A further objective of the present invention has been to provide means for converting coded data to a physical length corresponding to a multi-digit number. Each digit can have a range from 0 to 9 and this range will be referred to as a "decade." In general, these means comprise a plurality of matrix members, such as the dials, referred to above, one of the matrix members corresponding to the decade associated with each digit of the multi-digit number. Each matrix is provided with a set of rods of uniformly graduated length in the manner outlined above, corresponding to the decade digits.

An electrically controlled driving means, or selector mechanism, is connected to the matrices for shifting them to selectively bring the rods of each matrix into registry with an axis of alignment. These driving means are controlled by a plurality of decade switches, such as the selector switches noted above, one decade switch being interconnected with each matrix. The decade switches are actuated in accordance with the stored data and function to position each matrix so that the rod in registry with the axis of alignment corresponds to a digit stored by the coded data. In the final positioning operation, the rods in registry with the axis of alignment are shifted into endwise abutment and are of a total length equal to the multi-digit number stored by the coded data.

Various features and advantages of the invention will be more fully apparent to those skilled in the art from the following description and related drawings.

In the drawings:

Figure 1 is a general top plan view of a jig boring machine equipped with the programming apparatus of this invention.

Figures 2 to 4 inclusive are diagrammatic views illustrating the motions of the table in relation to the measuring rods during a programming cycle.

Figure 7 is a sectional view taken along line 7—7 of Figure 6, illustrating the driving connection from one of the dial-setting gears to a selector dial.

Figure 8 is a sectional view taken along line 8—8 of Figure 6, showing the detent mechanism of one of the dials.

Figure 10 is a fragmentary view showing the dial setting cams and actuating mechanism which shifts the ten-inch measuring rods to active or inactive position.

Figure 11 is a sectional view taken along line 11—11 of Figure 10, further illustrating the selector cams for the ten-inch rod mechanism, the cams being shown in a zero or inactive position.

Figure 12 is a sectional view similar to Figure 11, showing the cams rotated to a position in which the selected ten-inch rods are shifted to an active position.

Figure 13 is a sectional view taken along line 13—13 of Figure 10, illustrating the stop mechanism which locates the ten-inch rods in their active or inactive position, the rods being shown in their inactive or lowered position in full lines and in the active position in broken lines.

Figure 15 is a fragmentary side elevation of the turret.

Figure 16 is a sectional view taken along line 16—16 of Figure 15, further illustrating the turret.

Figure 17 is a sectional view taken along line 17—17 of Figure 15, illustrating the abutment end of the turret.

Figure 18 is an enlarged sectional view taken along line 18—18 of Figure 15, detailing the turret and its clamping mechanism in relation to the ten-inch rods.

Figure 21 is an enlarged sectional view taken along line 21—21 of Figure 20, detailing one of the clutches which control the operation of the dial-setting gears.

Figure 22 is a cross sectional view taken along line 22—22 of Figure 21, further detailing the clutch.

Figure 24 is a sectional view taken along line 24—24 of Figure 19, further detailing one of the selector switches and clutch linkage.

Figure 25 is a fragmentary view projected from Figure 24, further illustrating the clutch linkage.

Figure 26 is a diagram showing the electrical control system of the programing apparatus.

General arrangement and operation

Figure 6:
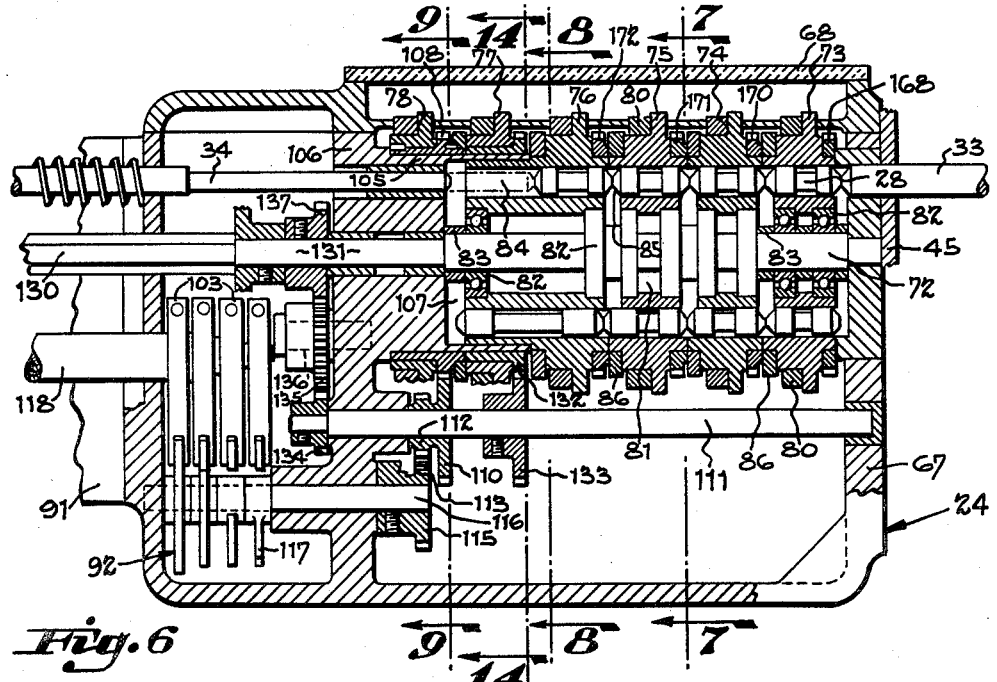
Figure 6 is a sectional view taken along line 6—6 of Figure 5, detailing the construction of the selector dials of the measuring apparatus.

As noted above, the programing apparatus of the invention is shown in relation to a jig boring machine having a dial-operated measuring apparatus of the aforesaid co-pending application, Serial No. 485,851. According to the co-pending application, the dials of the measuring apparatus are set by hand to a given lineal dimension; then a power driven positioning apparatus shifts the table or cross slide from a given position to a new position according to the dimension specified by the measuring dials. The automatic programing apparatus of the present invention rotates the dials to selected measurements in response to electrical impulses transmitted from a reading device of the type known in the programing art, the dimensional data being reproduced from punched cards, perforated tape or similar record media fed into the reading device.

Referring to Figure 1, the jig boring machine comprises a bed 10 and a column (not shown) rising vertically from the rearward side of the bed. A drill head (not shown) is mounted upon the column above the bed and includes a vertical spindle, indicated diagrammatically at 11 in Figure 1, projecting downwardly toward the bed. The top surface of the bed includes transverse ways 12 slidably supporting a saddle or cross slide 13 for transverse motion across the bed; the upper surface of the cross slide includes longitudinal ways 14 upon which is slidably mounted a work table 15. The workpiece 16 is clamped upon the table and is shifted with respect to the spindle by the combined transverse and longitudinal motions of the saddle and table.

The table may be shifted longitudinally along the ways 14 of the saddle by operation of a hand wheel 17 which is connected through a gear train to a longitudinal lead screw 18. The saddle and table as a unit may be shifted transversely along the bed by operating a second hand wheel 20 which is connected through a similar gear train to a transverse lead screw 21. During an automatic cycle, the positioning apparatus shifts the slide and table by operation of the transverse and longitudinal splined shafts 22 and 23 of the saddle and table respectively, as explained later, with reference to the positioning mechanism.

The final position of the table relative to the saddle is governed by the measuring apparatus in accordance with the setting of the dials of the dial housing which is indicated generally at 24 in Figures 1 and 6. The dials are rotated to the required dimension by the selector mechanism of this invention indicated generally at 25, which is mounted directly on the dial housing 24. A similar dial housing 26 including an automatic selector 27 governs the position of the saddle with respect to the bed. The measuring devices of the table and slide are identical and for this reason, only the table apparatus is disclosed in detail.

Measuring rods

Described generally, the measuring apparatus of the co-pending application comprises three groups of measuring rods or gauges of incremental length, the groups being indicated diagrammatically at 28, 30 and 31 in Figures 2 to 4. The rods indicated at 31 are arranged in length increments of one inch each and are identified in the specification as "one-inch rods." The rods indicated at 30 are arranged in increments of ten inches and are designated as "ten-inch rods." The four sets of rods, indicated collectively at 28, are arranged in decimal increments and are designated as "decimal rods." The rods of each group act as length gauges and their dimensions are held within the exceptionally close limits of standard gauge practice.

The decimal rods 28 provide additive measurements in the order of tenths, hundredths, thousandths, and ten-thousandths of an inch and carry a selected dimension to the fourth decimal place. Each set of decimal rods 28 is arranged in a series of ten rods and the shortest rod of each of the four sets represents zero, as indicated at "0" in Figure 2.

The one-inch rods 31 are also arranged in a series of ten, the shortest rod representing zero, the remaining rods increasing in steps of one inch, such that the longest rod provides a nine-inch measurement. When the selected one-inch rods and decimal rods are shifted into axial alignment, they provide in combination any selected length measurement from 0.0000″ to 9.9999″. In the present disclosure, the four ten-inch rods 30 provide ten-inch increments which are added to the decimal rods and one-inch rods, such that the combined rods provide any selected measurements from 0.0000″ to 49.9999″ in steps of one ten-thousandth of an inch.

The decimal rods 28 of the table are carried in respective dials which are mounted within the dial housing 24 as explained in detail later. The one-inch rods 31 are mounted within a turret 32 (Figure 15) which is carried by the table 15, such that the one-inch rods move with the table relative to the decimal rods of the dial housing (Figure 3). The ten-inch measuring rods 30 are mounted relative to the saddle 13, and in order to conserve space, they shift transversely from an inactive position to a measuring position in alignment between the selected decimal rods and one-inch rods (Figures 3 and 18). When in the inactive position, the ten-inch rods reside in alignment with one another but below the line of movement of the one-inch turret 32 to allow the turret to pass with the table above the ten-inch rods.

As described in greater detail later, the decimal dials and one-inch turret are mounted for rotation upon a common axis, such that the ten rods of the turret and dials are disposed in concentric circles to be rotated selectively into alignment with one another. The arrangement is such that the table may be shifted toward the right to bring the turret rods into endwise contact with the decimal rods of the dials when the ten-inch rods are in their inactive position (Figure 2).

In setting up the machine for boring a series of holes, the table is shifted to the right to locate the workpiece at a base reference position relative to the spindle. The measuring apparatus, as explained later, locates the hole centers in spaced relation to the base reference surface or point previously established. In the initial set-up operation, the measuring rods are shifted to a zero position as shown diagrammatically in Figure 2. In zero position, and in the subsequent measuring positions, the selected decimal and one-inch rods reside in axial alignment with one another between a spring loaded feeler rod 33 and a thrust rod 34, the aligned rods being shifted toward the right by an abutment rod 35 which is carried by the table. As shown in Figure 2, the abutment rod 35 contacts the selected one-inch rod, such that the motion of the table is transmitted from the abutment rod 35 through the selected one-inch and decimal rods and thrust rod 34, to the feeler rod 33. The feeler rod is arranged to stop the table at its selected position during the subsequent positioning operations as described later. In principle therefore, the measuring rods act as gauges or spacers between the table and saddle to locate the hole centers precisely with respect to the base reference point or surface.

Automatic positioning

As noted earlier, the co-pending application discloses the dial-operated measuring apparatus in relation to an automatic positioning apparatus of the earlier Knosp et al. Patent No. 2,674,706. The programing apparatus of this invention is illustrated in conjunction with the some automatic positioning apparatus; in the present instance, the programing apparatus selects the measuring rods and initiates the automatic positioning cycles. In order to disclose the operation of the programing apparatus, the essential principles of automatic positioning are disclosed herein.

Referring to the lower portion of Figure 26, the positioning apparatus is shown diagrammatically in relation to the table and includes a reversible rapid traverse motor 36 and a positioning motor 37. When a positioning cycle is initiated, the traverse motor first shifts the table at a traverse rate to a back-up position to allow the measuring rods to be shifted to gauging position thereafter the traverse motor shifts the table toward the right at the traverse rate during the positioning cycle. As the final position is approached, the traverse motor 36 is deenergized and the positioning motor 37 is energized to inch the table slowly to its final position. The slow positioning rate makes it possible to stop the table precisely at its final position without danger of over-travel. As disclosed in the patent, the positioning motor is reversed momentarily after it stops the table at final position in order to relieve the drive system of any stresses between the motor and table, thereby to prevent minute shifting after the table is stopped.

As indicated in Figure 26, the traverse motor 36 is in driving connection with the lead screw 18 which, as indicated earlier, may also be rotated by the hand wheel 17. The lead screw 18 is threaded through a nut 38, the nut being confined endwisely within a gear box 40 attached to the table as indicated in broken lines. Rotation of the traverse motor 36 in one direction thus rotates the lead screw to shift the table toward the left to its back-up position and reversal of the motor traverses the table toward the right. The traverse motor speeds up the positioning cycle since it shifts the table at a speed which is considerably greater than the positioning speed.

During the positioning motion, the lead screw 18 remains stationary and the nut 38 is rotated relative to the lead screw by the positioning motor 37. The positioning motor is in driving connection with the splined shaft 23 previously noted, the splined shaft being slidably keyed to a worm 41 meshing with the teeth of a worm wheel 42. Worm wheel 42 drives a second worm 43 which meshes with the worm wheel 44 of nut 38, thus providing a reduction drive for rotating the nut 38 at a slower positioning rate relative to the lead screw 18.

As shown in Figures 6 and 26, feeler rod 33 projects from a switch box 45 which is interconnected with the control circuit of the positioning apparatus. Since the control unit and its associated circuit does not form an essential part of this invention, this portion of the positioning apparatus has been omitted from the drawings, the complete apparatus being disclosed in the aforesaid Knosp patent.

In general, the switch box 45 comprises a housing which is attached directly to the dial housing (Figure 6), the outer end of the feeler rod 33 residing within the dial housing in alignment with the last decimal rod of the series. The feeler rod is spring biased toward the decimal rod and its movement toward the rod is limited by a stop element (not shown) such that the end of the rod does not interfere with normal rotation of the decimal rod dial. The control housing encloses a rapid traverse switch and a final positioning switch (not shown) both of which are in operative connection with the feeler rod.

In initially setting up the machine for boring a series of holes, the table is first shifted to a position to align the reference surface of the work precisely with the axis of the spindle as explained earlier. In the preferred mode of operation, the reference surface or point is located at the left end of the work, and the hole centers are measured from the reference point toward the right. By way of example, the edge 46 of the workpiece (Figure 1) may represent the reference plane, the table being shifted toward the right, as indicated, to locate the second hole 47 (broken lines) in alignment with spindle 11. In this example, the first hole 48, previously bored, also was measured from edge 46. In establishing the reference point, the table preferably is shifted to its zero position to the right as noted previously with respect to Figure 2. It will be understood at this point, that the turret is adjustable lengthwise relative to the table to bring the zero one-inch and decimal rods into endwise abutment between the abutment rod 35 and feeler rod 33 as indicated. At the initial zero setting, the adjustment is such that the spring loaded feeler rod is depressed slightly to a position in which it normally deenergizes the positioning motor at the final position of the table at the selected hole center.

After setting for the base reference point, the table is shifted toward the left as shown in full lines in Figure 3 to allow the selected measuring rods to be shifted to their measuring positions. This allows the spring loaded feeler rod to spring to the left to its normal position.

After the measuring rods are selected, the positioning cycle is initiated. At this point, the rapid traverse motor 36 is energized to shift the table toward the right at the traverse rate by rotation of lead screw 18. During the traverse portion of the positioning cycle, the table shifts abutment rod 35 and turret 32 toward the right, thus taking up the clearance 50 and 51 (Figure 3) which exist between the aligned measuring rods. As the table approaches final position, it begins to depress the feeler rod toward the right, causing the feeler rod to trip the rapid traverse switch. At this point, the control circuit plugs the rapid traverse motor 36 to a stop and energizes the positioning motor 37. The positioning motor now continues feeding the table toward the right at a slow positioning rate until the feeler rod trips the positioning switch at final position. This action deenergizes the positioning motor and stops the table at final position. It will be understood that the positioning switch trips when the feeler rod reaches the same preloaded pressure for which it was set initially at the reference position (Figure 2), hence the new position of the table and workpiece is determined precisely by the additive length of the selected measuring rods under the same preloaded pressure. It has been found in practice that the hole centers are located consistently within a tolerance of plus or minus .0001" upon each operation. In its preferred embodiment, as disclosed in the patent, the table is traversed at the rate of 72 inches per minute toward the right until it displaces the measuring rods and feeler rods sufficiently to trip the rapid traverse switch. At this point, the positioning motor continues the advancement at the rate of .415 inch per minute until the table is inched to its final position.

As shown diagrammatically in Figure 26, the electrical energy is supplied to the control circuit of the positioning apparatus by power lines 52, the traverse and positioning motors being energized by the power lines 53 and 54 which lead from the control circuit. The control circuit forms no part of the invention and for this purpose, has been shown in block form in Figure 26. It will be understood that the control circuit includes the necessary relays and other components for providing the sequential operation of the traverse and positioning motors in response to the feeler rod 33.

Under manual control, as described in the patent, the positioning cycles are governed by push button switches as indicated diagrammatically in Figure 26. The push button indicated at 55 shifts the table toward the left and the push button 56 shifts the table toward the right. The intermediate push button 57 initiates the positioning cycle after the table has been shifted to the left and the measuring rods selected. A stop button 58 decommissions the entire apparatus upon being depressed. The saddle positioning apparatus is provided with a similar set of manual switches.

In the present disclosure, the programing apparatus governs the movements of the table and the selection of measuring rods in proper sequence. The manual switches 55 and 56 are utilized only in the initial set-up operation, as described earlier. The table traverse motion toward the left is under control of the programing apparatus, through the medium of stationing switches mounted relative to the table and interconnected in the programing circuit. As indicated in Figures 2–4, the stationing switches 60 to 63 control the back-off position of the table, the switches being located in positions to be tripped by the table when it has been backed off a sufficient distance to allow the preselected ten-inch and one-inch rods to be shifted to their gauging position. In the present disclosure (Figure 3), the table is shown retracted to the stationing switch 62, allowing the first three ten-inch rods to be elevated, plus the longest rod of the turret.

In addition to the ten-inch stationing switches, there is also provided a back-off switch 64 which is actuated by a tripping element 65 mounted on thrust rod 34. This switch represents the zero position of the table and it is tripped when the pressure is applied to the thrust rod at the zero set-up position (Figure 2). The back-off switch 64 is interconnected in the control circuit to initiate the dial selecting cycle of the programing apparatus after the table has been shifted to a back-off position.

Adjacent the back-off switch 64, there is provided a zero to nine inch stationing switch 66. This switch is tripped by the table when the table has been shifted to a back-off position which is slightly greater than nine inches from the zero position to allow the one-inch turret to be rotated to bring the rods from one to nine inches into measuring position. In other words, this switch regulates the back-up position when no ten-inch rods are to be shifted.

It will be understood at this point, that the programing apparatus includes a cycle control switch which is depressed by an operator to start the cycle. When the button is depressed, the table is shifted toward the left (Figure 3), the back-off position being controlled by the programing apparatus which sends a signal to the back-off switches. In the present example, a signal is sent to back-off switch 62 to cause the table to be backed off until this switch is tripped, thus allowing the three ten-inch rods and the required one-inch and decimal rods to be shifted to measuring position as shown. The programing cycle is described later in detail with reference to Figure 26.

*Dial mechanism*

As noted earlier, the dial housings 24 and 26 for the slide and table respectively are disclosed in detail in the copending application. The dials thereof are rotated by the present selector mechanisms 25 and 27 which are attached to the respective dial housings. The dial housing and its associated selector mechanism are identical for the table and saddle and the following description of the table apparatus also applies to the corresponding apparatus of the saddle. Since the exact details of the dial mechanism are not pertinent to the present invention, the following description has been limited to the essential features by which the dial housing coacts with the programing apparatus in selecting the measuring rods.

Referring to Figures 5–8, the dial housing comprises a box-like casting 67 secured to the saddle 13 and having a transparent cover or window 68 hinged to the top of the casting. In the present structure, the front cover of the housing, which is shown in the co-pending application, has been removed, and the housing 70 of the automatic selector mechanism is attached by bolts 71 (Figure 19) directly to the dial housing. As described later, the selector housing includes selector gears which are in driving connection with the gears of the selector dials.

Figure 5:
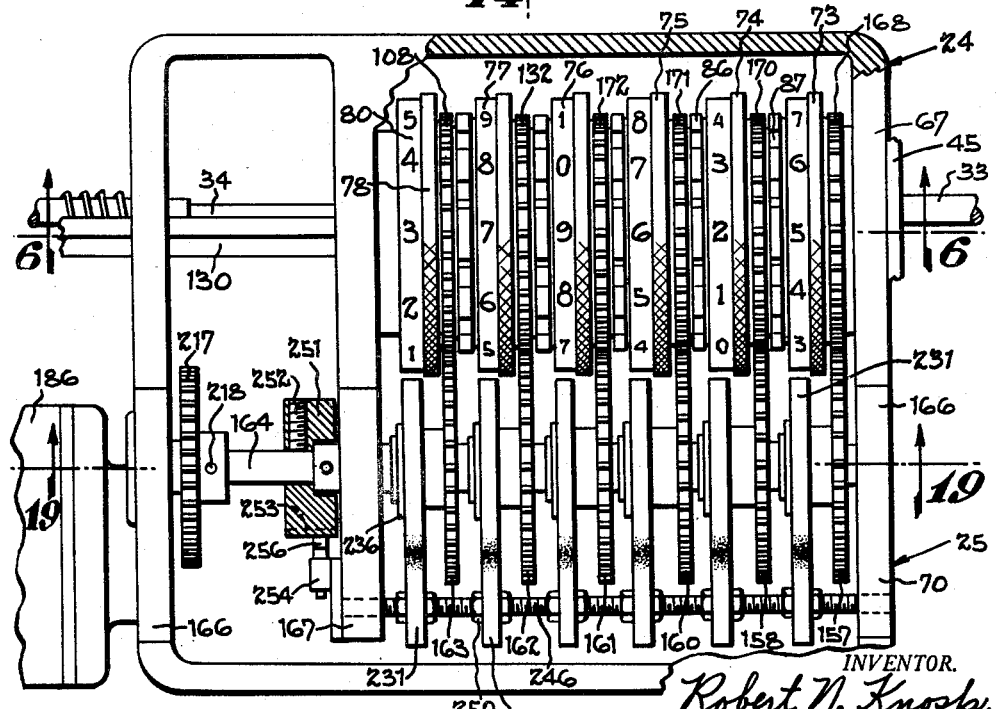
Figure 5 is an enlarged top plan view taken from Figure 1, showing the dial housing and selector mechanism with the cover removed.

As shown in Figures 5 and 6, the dial housing encloses six selector dials or matrix members which are rotatably journalled upon the axis of a dial shaft 72. The first four dials which are indicated at 73 to 76, carry the decimal measuring rods 28. The one-inch dial, indicated at 77, is in driving connection with the turret 32 and rotates the selected one-inch rod of the turret to its measuring position. The ten-inch dial, which is indicated at 78, is in driving connection with the ten-inch rods and serves to shift the selected ten-inch rods into measuring position.

Each dial is provided with a graduated ring 80 which indicates the order of length increments, such that the dials collectively provide direct reading of the selected dimensions through the transparent window 68. The decimal and one-inch dials have ten graduations indicating "0" to "9" and the ten-inch dial has five graduations indicating "0" to "4." As shown in Figure 5, the dials are rotated to the dimension 37.9625″, the selected measuring rods for this dimension being shown diagrammatically in Figure 4. In this example, three of the ten-inch rods 30, and the seven-inch rod 31 of the turret have been shifted to measuring position in alignment to provide the 37″ dimension. For the decimal measurement, selected decimal rods 28 providing the .9625″ dimension have been shifted to measuring position. In making the selection by hand, as disclosed in the copending application, the hinged window 68 is opened and the several dials are rotated with the fingers, the periphery of each dial being knurled for frictional engagement.

In the present structure, each decimal dial is in the form of a barrel having a central bore 81 rotatably journalled upon the dial shaft 72 by means of ball bearings 82. The ball bearings are located by suitable spacers 83 slipped upon the dial shaft 72 between the bearings. Each decimal dial includes a series of measuring rod bores spaced equally from one another in a circle which is concentric to the dial shaft such that the decimal rods 28 within the bores may be indexed in alignment with one another as indicated in Figure 6. As explained earlier, the four sets of decimal rods 28 provide the measurements in tenths, hundredths, thousandths, and ten-thousandths of an inch from the zero setting. In the present disclosure, the shortest rod of each of the decimal sets has a length of 1.000″, the rods of each set increasing in the respective orders indicated above from this basic length.

It will be noted in Figure 6, that the inner end of the spring loaded thrust rod 34 normally resides in spaced relation to the zero measuring rod so as to provide the clearance 84 which allows the dials to be rotated, the clearance being sufficient to allow the longest decimal rods to reside endwisely between the feeler rod 33 and abutment rod 34. As explained earlier, after the base reference point on the work is established (Figure 2), the abutment rod 34 and turret 32 are adjusted relative to the table to depress the thrust rod into contact with the zero decimal rods. This setting is shown in broken lines in Figure 6. The adjustment is such that the feeler rod 33 is depressed to its tripping position; hence, it will be seen that the thrust rod will spring to its normally extended position, as shown in full lines, when the table, together with abutment 35 and turret 32 are shifted to the left (Figure 3) for the selection of the measuring rods.

After the selection is made, the selected decimal rods 28 reside in alignment between the end of the thrust rod 34 and feeler rod 33, the spacing between the ends of the two rods being slightly greater than the additive length of the longest decimal rods of the series. To provide a camming action, the ends of each rod are tapered as at 85, allowing the rods to shift endwisely without interference during relative rotation of the dials.

Figure 9:
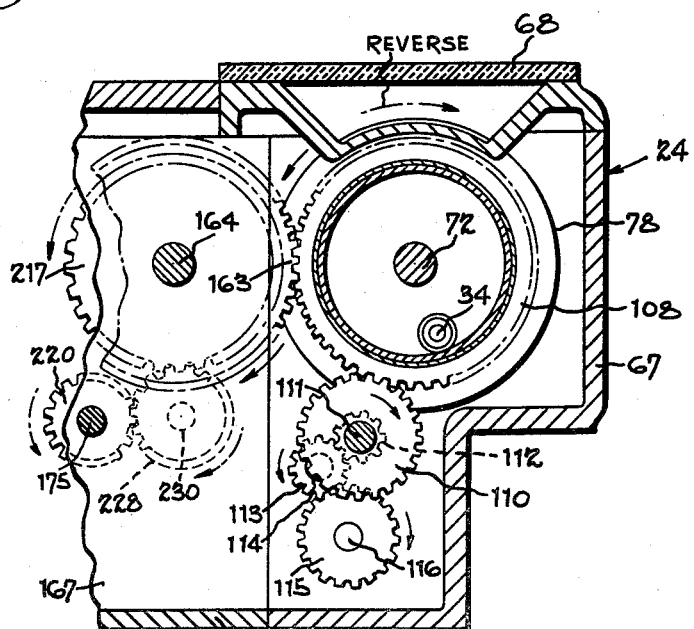
Figure 9 is a sectional view taken along line 9—9 of Figure 6, showing the gear train from the ten-inch dial to the mechanism which shifts the ten-inch rods.

The tapered ends terminate in a flat anvil surface which provides a bearing area when the rods are in alignment. It will be understood that when the turret rod is depressed during the positioning cycle, the clearance between the rods, if any exists, is taken up as the feeler rod is depressed; consequently, the rods locate the table precisely at the dimension to which the dials are set. For purposes of illustration, the coaxial thrust rod 34 and feeler rod 33 are shown displaced from their true positions in Figure 6; the actual center of the rods 34 (and feeler rod 33) is shown in Figure 9.

In order to hold the dials in selected positions, the dials (excepting the ten-inch dial) includes a detent wheel 86 which is notched as at 87, the notches corresponding with the location of the dial graduations (Figure 8). Each detent wheel is engaged by a roller 88 carried on a spring loaded detent arm 90. When the roller is engaged in one of the notches of the detent wheel, the selected measuring rod is located in axial alignment with the rods 33 and 34 as indicated in Figure 9.

The turret 32 and the ten-inch rods 30 are located within an elongated housing 91 which extends from the dial housing 24 as shown in Figures 1 and 18. The ten-inch dial 78 shifts the four ten-inch rods successively from zero position to the measuring position as the dial is advanced from its zero graduation. As explained earlier, the turret and decimal dials are rotatable upon a common axis, the rods of the turret and dials being spaced in concentric circles for selective alignment. It will be observed in Figure 18, that the ten-inch rods 30 reside below the plane of movement of the turret when in their inactive position. When shifted to measuring position, the selected ten-inch rods reside along the same axis as the selected decimal and one-inch rods as shown in broken lines in Figure 18.

Referring to Figure 10, the ten-inch rods 30 are selected by respective cams indicated generally at 92 which are in driving connection with four rock shafts or tubes 118 to 122, telescopically interfitted for rotary motion relative to one another. The tubes are rotatably journalled within the elongated housing 91 as explained later, each rock shaft having a respective pair of rocker arms 97 secured thereto, the outer ends of which include bores slidably embracing the endwise portions of the respective ten-inch rods. Each ten-inch measuring rod is yieldably biased toward the left by a compression spring which urges the rods endwisely against a stop (not shown).

To control the position of the measuring rods, in their active or inactive position, each of the rock shafts include a stop collar 98 (Figure 13) fixed to the shaft and provided with a pair of shoulders 100—100 which are engaged by stop screws 101—101 threaded through the bottom wall 102 of the elongated housing. When shifted to its active position, the left hand stop screw engages its shoulder with the measuring rod disposed in alignment with the selected one-inch rod of the turret as shown in broken lines in Figures 13 and 18.

The motion of the cams 92 is transmitted to the individual rock shaft tubes by a series of cam levers 103 (Figures 10-12), one for each tube, the levers being non-rotatably clamped to the respective tubes. Each lever includes a cam roller 104 tracking upon a respective cam. The cams are so arranged that the ten-inch rods sequentially are elevated to the active position of Figure 13, starting with the first measuring rod to the right.

Referring to Figure 6, the ten-inch dial 78 is rotatably journalled upon a boss 105 projecting from the intermediate wall 106 of the dial housing. Boss 105 has an internal bore 107 concentric with the dial shaft 72, the thrust rod 34 projecting into the bore for cooperation with the decimal measuring rods. The cams 92 are in driving connection with the ten-inch dial 78 by way of a gear train (Figure 9), consisting of a gear 108 secured to dial 78 and rotatably journalled on boss 105. A gear 110 meshes with dial gear 108 and is loosely journalled on a counter shaft 111 which is rotatably journalled in the dial housing. Gear 110 includes a pinion 112 meshing with a reversing idler gear 113 journalled on a stub shaft 114 of the housing (Figures 6 and 9). The idler gear 113 meshes with a gear 115 non-rotatably secured to the cam shaft 116.

Referring to Figure 10, the four cams 92 are non-rotatably secured to shaft 116, the cams having leading edges 117 located in four angular positions, such that the four leading edges are advanced succesively to the cam rollers as shaft 116 is rotated in the rod selecting direction indicated by the arrows in Figures 9 and 12. The tracking surface of the cams is concentric to shaft 116, the tracking surfaces having respective lengths as indicated by angles A to D (Figure 11) and have common trailing edges. The four cam levers 103, which correspond to the cams, are indicated at A' to D' and they are actuated in sequence by the leading cam edges 117.

Referring to Figure 11, the angles A to D, which indicate increasing lengths of the cams, correspond to the degree of rotation imparted to the cams upon each stepwise advancement of the ten-inch dial from one graduation to the next. Thus, when dial 78 is advanced from zero to the first graduation in the direction indicated by the arrows in Figure 9, the leading edge 117 of the first cam engages the roller 104 of lever D' which is secured upon the tube 118. This shifts the cam lever as indicated at Figure 12, rotating tube 118 in a direction to elevate the first ten-inch rod to the position shown in broken lines in Figure 13. During the next stepwise advancement, the leading edge of the next cam engages the roller of lever C' in a similar manner to rotate tube 120 and elevate the second measuring rod. Stepwise rotation of the cam through the remaining angles is effective to rock in sequence the tube 121 and 122 to elevate the remaining rods of the series.

When the parts are rotated in the opposite direction, the measuring rods are shifted to their lowered positions in reverse order due to the arrangement of the cams. This motion is imparted by respective torsion spring 126 as explained below.

It will be noted, that for simplicity, the details are disclosed only in relation to the first tube 118, the structure being identical for several tubes. As shown, the first tube 118 is rotatably supported in a pair of spaced bearing blocks 123—123 secured to the bottom housing wall 102, with the rocker arms 97—97 residing between the bearings. The tube is confined against endwise or axial motion by the collars 124. To urge the measuring rods normally to their lowered or inactive position, each rock shaft includes a collar 125 secured to the tube adjacent the left bearing block 123. A torsion spring 126 has one end anchored to the collar 125 as at 127 and has its opposite end anchored in the bearing block 123. Each spring 126 is slightly preloaded to urge the tube in the rod lowering direction, such that the cam rollers 104 are urged by the springs against the tracking surfaces of the cams.

Referring to Figures 15-18, the one-inch turret 32 is rotatably supported by the slide block 128 which is clamped to the table for movement therewith; the slide block may be unclamped and shifted with respect to the table when the machine initially is set up as previously noted with respect to Figure 2. The turret is rotated by the hexagonal selector shaft 130 which is in driving connection with the one-inch dial 77 through a gear train as described below. The hexagonal shaft extends from the dial housing 24 and through the elongated housing 91 on an axis common to the axis of dial shaft 72. The turret is slidably keyed to the hexagonal shaft for rotation with the shaft in response to rotation of the one-inch dial 77.

Figure 14:
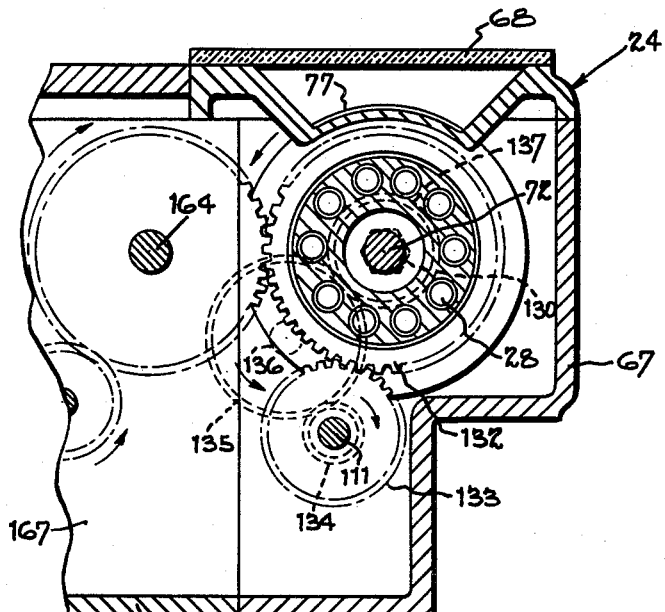
Figure 14 is a sectional view taken along line 14—14 of Figure 6, showing the dial setting gear train from the turret selector dial to the shaft which rotates the turret measuring rods to selected positions.

Referring to Figure 6, the end portion of the hexagonal shaft includes a pilot shaft 131 rotatably journalled in the intermediate wall 106 of the dial housing. The one-inch dial 77 is keyed to the hub of the dial gear 132, the gear being rotatably journalled upon the boss 105. Gear 132 is in mesh with a gear 133 which is secured to the counter shaft 111 and drives a pinion 134 fixed to the outer end of the countershaft. As shown in Figure 14, pinion 134 meshes with an idler gear 135 rotatably journalled on stub shaft 136, the idler gear meshing the final drive gear 137 which is secured to the pilot shaft 131. The gear train from the dial rotates the hexagonal shaft at a one-to-one ratio in the direction indicated by the arrow in Figure 16.

As shown in Figure 18, the slide block 128, which carries the turret, is clamped in its adjusted position along the edge of the table by a T-nut 140 slidably engaged in a T-slot 138 of table 15 and threaded on a stud 141 which is carried by the slide block. The stud includes a tapered socket 142 and a clamp screw 143 includes a tapered end 144 which cams into the socket to draw the T-nut into clamping engagement. The clamping nut is rotated by means of the clamp handle 145 attached to clamp screw 143. The slide block is in permanent connection with the T-slot by a pair of similar T-nuts slidably confined in the slot and connected to the slide block by studs (not shown).

The turret 32 is rotatably confined endwisely between the arms 146—146 of the slide block 128 as shown in Figure 15. The turret is of sectional construction and includes a sleeve 147 journalled in the arms 146 and slidably keyed to the hexagonal shaft 130 as at 148. The one-inch measuring rods 31 have their left hand ends slidably carried in a head 150 which is attached to sleeve 147 for rotation with the selector shaft. The opposite ends of the rods are slidably carried by lugs 151 equally spaced apart and staggered along the length of the turret. Each lug includes a mounting collar 152 slipped on the sleeve and attached by respective set screws 153. As noted earlier, the one-inch measuring rods 31 are centered at spaced points which correspond with the centers of the decimal rods for selective alignment therewith.

The left end of the sleeve 147 which rotates the turret includes a head 154 having ten detent recesses 155 which correspond to the spacing of the measuring rods. The detent recesses are engaged by a ball 156 carried in the arm 146 of the slide block and urged toward the recesses by a compression spring. The detent recesses latch the turret in its selected rotary measuring positions. The abutment rod 35 also is mounted in the arm 146 and provides a gauge surface which contacts the end of the selected measuring rod.

It will be noted that the turret mounting arrangement above described, allows the turret to be shifted relative to the table to a zero position when the machine initially is set up, with the base reference point of the work aligned with the axis of the spindle. When the feeler rod 33 is depressed to its tripping position, then the clamp lever 145 may be actuated to clamp the slide block and turret in fixed position to the table. The apparatus is then in condition to be placed under the control of the programing apparatus for setting the measuring rods and positioning the table.

Dial selector mechanism

Referring to Figures 5 and 6, the six dial setting gears 157 to 163, which rotate the dials, are mounted on a driven shaft 164 journalled as at 165 in the end walls 166 and intermediate wall 167 of the selector housing. These walls form continuations of the walls of the dial housing 24 to which they are bolted as at 71 as previously noted. The four decimal dials are provided with dial gears 168 to 172, which mesh with the setting gears 157 to 161. The setting gears 162 and 163 mesh with the gears 132 and 108 of the ten-inch dial 78 and one-inch dial 77. The dial gears 132 and 108 form a part of the gear trains of the ten-inch rods and turret as described earlier.

Figure 19:
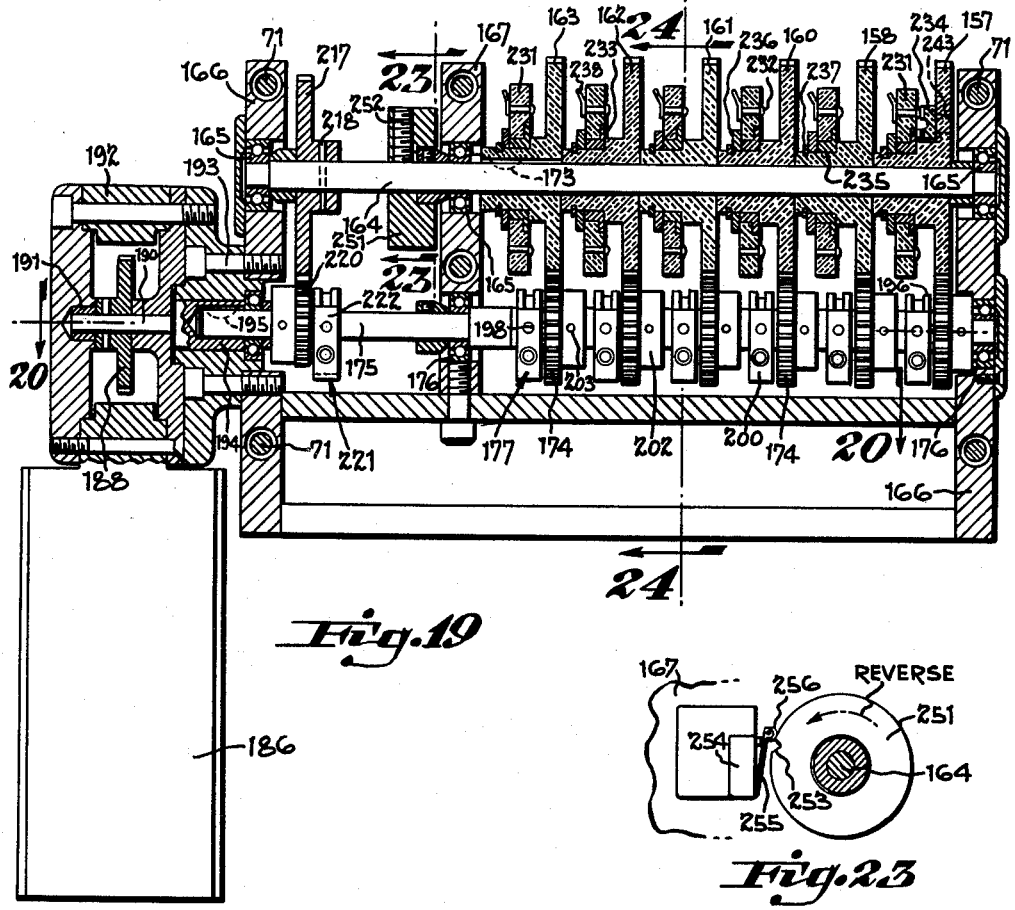
Figure 19 is a sectional view taken along line 19—19 of Figure 5, detailing the dial-setting gears and switches of the selector mechanism.
Figure 23:
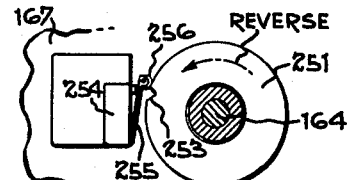
Figure 23 is a sectional view taken along line 23—23 of Figure 19, illustrating the detent disk and directional switch which controls the reverse rotation of the ten-inch dial at the start of a selecting cycle.

It will be understood at this point, that the five dial setting gears 157 to 162 are rotatably journalled upon the shaft 164, while the gear 163, which drives the ten-inch dial is keyed as at 173 to the shaft (Figure 19). This gear rotates the ten-inch dial in reverse as explained below. During the dial setting cycle, the six dial driving gears are rotated individually relative to one another to set the dials to their preselected positions in accordance with the electrical impulses sent from the reading device.

The setting gears 157 to 163 are driven by respective pinions 174 which are loosely journalled on a drive shaft 175 rotatably journalled as at 176 in the walls of housing 25. The individual pinions 174 are coupled selectively to the drive shaft by individual clutches 177 which are normally spring-urged to coupling position. The pinions are uncoupled from the drive shaft by respective solenoids indicated at 178 to 185 which are linked to the clutches as described later. It will be understood at this point, that the clutches normally are spring biased to coupling position (Figure 24) and are shifted to uncoupled position when the solenoids individually are energized. This occurs when the dials have been rotated to their selected positions, the dial driving gears being provided each with a brush which completes the circuit when the preselected dial position is reached.

Figure 20:
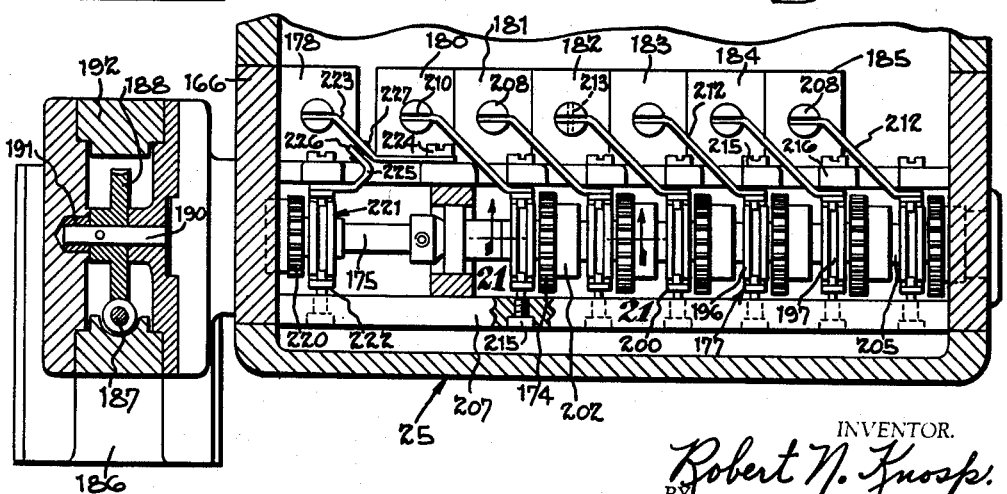
Figure 20 is a sectional view taken along line 20—20 of Figure 19, showing the pinions, clutches and actuating linkage of the dial selector mechanism.

Referring to Figures 19 and 20, the drive shaft 175 is driven by a constant speed dial motor 186 having a worm 187 meshing with a worm wheel 188 attached to a stub shaft 190. The stub shaft is journalled as at 191 in a gear housing 192 which forms a part of the dial motor, the gear housing being secured by bolts 193 to the end wall 166 of the selector housing. Stub shaft 190 includes a sleeve 194 within which the end of the drive shaft 175 is keyed as at 195 on an axis common to the stub shaft axis for rotation therewith.

Described in detail with reference to Figures 21–24, each clutch 177 comprises a clutch spool 196 having a peripheral groove 197 which is engaged by the opposed pins 198—198 of a yoke 200, the spool being slidable upon drive shaft 175. Each clutch spool includes a pair of driving pins 201—201 projecting from the face of the spool and passing slidably through bores in the pinion 174 which it drives. A drive collar 202 which is attached to the drive shaft as at 203, provides a stop which locates the pinion along the shaft in alignment with the setting gear with which it meshes. The opposite side of each pinion is contacted by a spacer sleeve 205 slipped upon shaft 175. The clutch spools are slidably mounted on the spacer sleeves. The face of the collar, which contacts the side of the pinion, is provided with a slot 204 extending across its diameter, the slot having a width to receive the ends of the driving pins 201. When the clutch spool is shifted toward the pinion to its engaged position (Figure 21), the ends of the pins project into the slot of the driving collar. Since the driving collar is attached to the drive shaft, it provides a driving connection through the pins to the pinion 174. When in disengaged position, the spool is shifted away from the pinion a sufficient distance to withdraw the ends of the pins from the slot, thereby to disconnect the pinion from the driving collar. The spool is shown in its disengaged position in broken lines in Figure 25, as explained below.

Referring to Figure 24, the six clutch solenoids 180 to 185 are attached as at 206 to a wall 207 extending lengthwise within the selector housing. Each solenoid includes a vertical plunger 208 which is slotted as at 210. Each plunger is normally urged upwardly by a compression spring 211 having its lower end seated upon the top surface of the solenoid. A yoke-actuating lever 212 has an end fitted into the slot of the plunger and connected to it by a pivot pin 213 (Figure 25). The opposite end portion of the lever is attached as at 214 to the yoke 200. The yoke is pivotally supported by opposed shoulder screws 215 threaded through the flanges 216—216, of wall 207, the screws having endwise portions pivotally passing through the limbs of the yoke. It will be noted in Figure 25, that the screws 215 are located upon a common axis below the axis of the yoke pins 198, such that the yoke pins swing in an arc to shift the clutch spool along the drive shaft.

The normal position of the parts, with the solenoid deenergized, is shown in full lines in Figure 25, the solenoid plunger being biased by spring 211 to its extended position to swing lever 212 and yoke 200 to clutch-engaging position. The parts swing to the position shown in broken lines in Figure 25 with the spring compressed, when the solenoid is energized. The above described structure is identical for the six clutches of the drive shaft.

The dial driving mechanism includes a reversing gear 217 which is pinned as at 218 to shaft 164 (Figure 19). The purpose of this gear is to rotate the setting gear 108 and ten-inch dial 78 back to a zero position at the start of the selecting cycle, thereby to lower the ten-inch measuring rods.

The reversing gear 217 is driven by a pinion 220 rotatably mounted on drive shaft 175 and controlled by a reversing clutch 221. The reversing clutch is identical to the structure described above except that the relationship of the parts is reversed. The reversing clutch is actuated by a reversing yoke 222 which shifts the clutch collar toward the left (as viewed in Figure 20) to an engaged position and toward the right to a disengaged position. The reversing yoke is actuated by a reversing solenoid previously indicated at 178 having a spring loaded plunger as described earlier. To reverse the direction of clutch motion, the plunger of the reversing solenoid is pivotally connected to a lever 223 having its outer end pivotally connected to a screw 224 attached to flange 216. The yoke is pivotally mounted by shoulder screws 215 as described above, and a yoke lever 225 is attached to the yoke at the axis of the shoulder screws. The yoke lever has an end portion 226 bent to reside parallel with lever 223. A pin 227 projecting from lever 223 pivotally connects the two levers. Accordingly, then the reversing solenoid is energized, its plunger swings lever 223 downwardly and this motion swings the yoke lever and yoke in a direction to shift the reversing clutch spool toward the right (away from pinion 220) to uncouple the reversing pinion 220 from drive shaft 175.

It will be understood at this point, that the ten-inch dial is rotatable only to the extent permitted by its cams 92; consequently, it is rotated back to zero at the start of a measurement selection cycle. In order to provide the reverse rotation of the setting gear 163 and ten-inch dial, the reversing pinion 220 meshes with a reverse idler gear 228 which is loosely journalled on a stub shaft 230 mounted in the end wall 166 of the housing (Figure 9). The reverse idler in turn meshes with the gear 217 which is pinned to the shaft 164, noted earlier. Accordingly, when the reversing clutch 221 is engaged, the reversing gears are driven in the direction shown by the reverse arrows (broken lines) in Figure 9, thereby rotating the driven shaft 164 and the setting gear 163, which is keyed to the shaft, in a reverse direction. Since the remaining five setting gears 157 to 162 are loosely journalled on the shaft 164, they remain stationary during the reversing cycle. The forward direction (dial setting) is shown in full line arrows in Figure 9.

The six setting gears 157 to 163 establish electrical circuits which energize their solenoids and cause the clutches to be disengaged after the gears have rotated their preselected positions as explained in detail later. The setting gears 157 to 163 are formed of a dielectric material, such as fiber composition. Mounted adjacent each gear is a stationary electrical contact ring 231, also formed of dielectric material and having contact buttons 232 corresponding in number to the digits on the dials (Figure 24). In other words, the contact rings of the five setting gears 157 to 162, which drive the one-inch dial and four decimal dials, each carry ten contact buttons corresponding to the digits zero to nine. The contact ring for the gear 163, which drives the ten-inch dial, is provided with five contact buttons corresponding to the digits zero to four.

The individual buttons of each contact ring are energized by the reading device of the programing apparatus in accordance with the selected position to which the dial is to be rotated, one button of each ring being energized during the selecting cycle, as described later. Each setting gear is provided with slip ring 233 formed of metal and each gear is provided with a brush or wiper 234 in wiping contact with the slip ring and having a portion traversing the contact buttons during rotation of the setting gears, as explained later in detail with reference to the control circuit. The arrangement is such that the gear rotates during the selecting cycle until the wiper reaches that contact which is energized, at which point an electrical circuit is completed to the solenoid which is associated with that gear. Upon being energized, the solenoid disengages the clutch, causing that particular gear and its dial to come to rest at the preselected position. This establishes the setting of that dial, and in a similar manner, the setting of all of the other dials individually.

Described in detail with reference to Figures 19 and 24, the hub of each setting gear is counter-turned as at 235 to receive the slip ring 233, which may be pressed or otherwise attached to the gear. A washer 236 is slipped upon the counter-turned hub and confines the contact ring in position, the washer being locked on by a snap ring 237. The contact buttons 232 are in the form of rivets passing through the contact ring 231 and engaging a terminal 238 to which the electrical lead wires 240 are attached. The brush or wiper 234 is formed of flexible sheet metal and is generally U-shaped as viewed in Figure 24 providing one limb 241 which serially engages the contact buttons and a second limb 242 which is in wiping engagement with the slip ring 233. The wiper 234 is attached to the gear by a pair of rivets 243. An electrical lead wire 244 is connected as at 245 to the slip ring, such that a circuit is established by way of the wiper between the slip ring and the selected contact button. The construction of the contact rings is identical for all the setting gears except that the ring which controls the ten-inch dial is provided with five contact buttons, as noted above.

In order to locate the contact buttons accurately in registry with the corresponding dial graduations, each ring is mounted for rotary movement with respect to the counter-turned gear hub 235 upon which it is journalled. For this purpose, a pair of threaded rods 246—246 extend lengthwise between the intermediate wall 167 and end wall 166 of the selector housing, the rods passing through respective arcuate slots 247—247 formed in the extended portions 248 of the contact rings. Each rod is provided with pairs of nuts 250 which exert a clamping action against opposite sides of the dial ring portion 248.

Driven shaft 164 is provided with a detent disk 251 (Figure 23), secured by a set screw 252 and including a detent notch 253. A directional control switch 254 is mounted in stationary position upon intermediate wall 167 and its plunger is actuated by a yieldable arm 255 attached to the switch, the outer end of the arm having a roller 256 tracked against the disk. When the selecting cycle is initiated, the reversing clutch and gear train cause rotation of detent disk 251 in the direction indicated by the broken line in Figure 23. If the ten-inch dial 78 is set at some graduation other than zero at this point, the reverse rotation drives the dial to its zero position (as in Figure 23) thereby to lower the ten-inch rods. As the notch 253 passes beneath the roller, the directional control switch is tripped momentarily, causing the reversing clutch to be disengaged, as explained later with respect to the electrical circuit. It will be understood at this point, that the relationship of the notch 253 and roller 256 represents the zero position of the dial. The momentum of rotating parts causes the notch to be advanced slightly beyond the roller at final position as indicated.

*Programing circuit and operation*

The programing circuit for regulating the table motions, as shown in Figure 26, is electrically interconnected with the selector mechanism 25 of dial housing 24 and is also interconnected with the switch box 45 of the table positioning apparatus. The present description is directed to the circuit for controlling the table; however, it will be understood that the circuit for controlling the saddle is identical, and for this reason, has been omitted. As explained earlier, the position of the workpiece depends upon the longitudinal position of the table and upon the transverse position of the saddle; accordingly, both the table and saddle programing circuits are energized during the positioning cycle. The table dimension and saddle dimension preferably are signalled from the same program reader.

Referring to Figure 26, the box labelled "program reader" represents a commercial reading apparatus which produces electrical signals from punched cards, perforated tape or other coded record media corresponding to the dimensions to be selected. As noted above, the reader also may be electrically interconnected with the saddle control circuit, such that the saddle position as well as the table position, may be signalled from the same record. In the present example, the dimension 37.9625", used previously in describing the selection of measuring rods, is used to illustrate the operation of the programing apparatus. The box which is labelled "program control circuit" represents the system of relays and other components which regulates the sequential operation of the selector dials, table back-off motion and table positioning motion. The components of the program reader and program control circuit, which are represented by the labelled boxes, all form a part of the commercial structure; therefore, the details are omitted.

As described in relation to Figures 9 to 13, the ten-inch dial 78 is in driving connection with the cams 92 and the degree of its rotary motion is limited by the cams. In other words, after the last cam is rotated to its rod elevating position, the dial is rotated to its "4" graduation and can be rotated no further. When the dial is rotated in the reverse direction back toward zero, then the fourth measuring rod is lowered first, then in sequence, the third, second and first rods are lowered. As explained earlier, the programing apparatus is arranged to rotate the ten-inch dial in reverse back to zero at the start of the dial setting cycle to lower the rods to inactive position, then at a later point, the first and successive rods are elevated in sequence by rotating the dial from zero in the forward direction, that is, in the ascending order.

Described briefly, the program cycle is initiated manually by depressing the cycle switch 260, shown as part of the program circuit box. When the cycle is initiated, a circuit is completed through the program circuit to the positioning apparatus, causing the table to traverse toward the left to a predetermined back-off position, (Figures 3 and 26) to allow the measuring rods to be selected. The components of the diagram are shown at the start of a cycle with the dials at zero. After the table has been backed to the left and stopped, the program circuit causes the dial 78 of the ten-inch rods to be rotated from its previous setting back to a zero position, then the dials of the one-inch turret and decimal rods are rotated to the digit positions which are signalled by the reader. Thereafter, the dial for the ten-inch rods is rotated from the zero position forwardly to its signalled position, and finally, the program circuit signals the positioning circuit to start the positioning cycle. The positioning apparatus carries out its own cycle once it receives the signal from the programing circuit and shifts the table toward the right to its final position.

After the table (and saddle) is stopped at final position, the machine is set for boring the hole at the selected location on the work. The program circuit and reader preferably are arranged to start the spindle drive and feed mechanism at this point; this apparatus is not relevant to the invention and has been omitted from the disclosure.

Described in detail, the program circuit is energized by the feed lines 261 and 262, which may represent a low voltage control circuit. In order to clarify the diagram, the control lines and feed lines are designated as positive or negative to identify the complete circuits. It will be understood that the reader and program control boxes complete the circuits from one feed line, through the reader, and through the various switches back to the second feed line, the polarity of the various control lines indicating the feed lines with which they connect, rather than their electrical polarity.

The reader is electrically connected to the ten contact buttons 232 (0–9) of each of the five contact rings of the digit selector switches or emitters 231. This connection is by way of the groups of wires 240, each group consisting of ten wires and extending from the reader to the individual switch contacts 232. These wires complete a circuit from the contacts within the reader (not shown) which are closed by the record media to energize the switch contacts according to the digits to be selected. At noted earlier, the five contact rings 231 control the decimal dials 73 to 77 and the one-inch dial 78. It will be remembered at this point, that during the cycle, the brushes 234 of the selector switches are rotated by the dial-setting gears 157 to 162 until they find the contact which is energized by the reader. Upon finding this contact, the clutch 177 for that selector switch is disengaged, causing the selector switch and its dial to a stop in the selected position.

The five contacts 232 (0–4) of the ten-inch contact ring or selector switch are connected to the reader contacts by way of the lines 263 and are energized according to the ten-inch rod (or rods) to be shifted to measuring position. The brush 234 of this switch also is rotated by its gear 163 from the zero position in the ascending order until it finds the contact which is energized by the reader, at which point the clutch 177 for this switch is disengaged to stop the ten-inch dial in its selected position. The contacts of the ten-inch selector switch are connected to the stationing switches 60 to 63 and 66 by way of the five branch lines 264.

The diagram shows the back-off switch and the stationing switches from zero to three tripped from their normal position to the position they assume when the table is shifted toward the left as in Figure 3. The normal position of these switches is indicated in broken lines in the diagram. The brushes 234 of the selector switches, indicated by the arrows, are all shown in their zero positions corresponding to Figure 2. It will be noted that the program cycle follows the same sequence from any given position of the table, after a given hole has been bored, in locating the center for a successive hole. In the present disclosure, the stationing switches are held by the table in the positions to which they are tripped during the left hand table motion and return to their normal dotted line positions when the table is shifted back toward the right. The back-off switch 65 shifts to the position shown in full lines when pressure is removed from thrust rod 34 as in Figure 3.

When the operator depresses the cycle switch 260, the program box completes a circuit from feed line 262, line 265, through the program reader and by way of one of the lines 263 and 264 to the third stationing switch 62. In other words, the reader signals for the 30" dimension which requires table back-off motion to the third stationing switch. Since the third stationing switch is in the broken line position at the start of the cycle, it energizes line 266 which leads to the position control box.

The opposite side of the position circuit is completed from feed line 261 by way of line 267. The position box now energizes the traverse motor 36 by way of power lines 53 in a direction to shift the table toward the left. The table continues its left hand motion until it trips the third stationing switch 62 to the position shown in full lines.

This deenergizes the line 266 to the position box, causing the traverse motor to stop the table at its back-off position. In its tripped position, the third stationing switch 62 now energizes line 268 which completes a circuit through the tripped back-off switch 65 to line 270 to the program box.

At this point, in the cycle, the program box energizes lines 271 and line 275 which lead to the clutch solenoids 180 to 185, this circuit being completed from feed line 261 by way of line 273. It will be remembered at this point, that the clutches are disengaged when the solenoids are energized. Accordingly, all of the clutches are disengaged except the reversing clutch, reverse solenoid 178 being deenergized.

After the forward clutch solenoids 180 to 185 are energized, the program box provides a time delay, then energizes the dial motor 186 by way of line 272, this line being placed in circuit with the feed line 261. The circuit of the dial motor is completed by the line 273 which is connected to feed line 262, thus completing the motor circuit.

It will be noted that the brush 234 of the ten-inch selector switch is shown in its zero position in full lines in the diagram. For illustrating the reversing action, the brush is shown engaging the "2" contact in dot-dash lines. Accordingly, the gear and brush will first be rotated in reverse as indicated by the arrow in dot-dash lines until it reaches the zero contact and trips the direction switch 254.

Assuming the ten-inch brush 234 to be at the "2" position (its reversing clutch 221 being engaged), operation of the dial motor drives the gear 163 and its brush in reverse to shift the ten-inch dial back to its zero position. At this point, the detent disk 251 (Figure 23) trips the direction control switch 254, momentarily closing the switch and causing the switch to send a signal from the energized line 268 through line 270 to the program box. The signal causes the program box to energize the reversing clutch solenoid 178 by way of line 274. The opposite side of the solenoid circuit is completed by way of line 273 connected to the feed line 262. The reversing clutch is now disengaged by its solenoid while the dial motor continues running.

As noted above, the solenoids of selector switches 180 to 185 were energized by lines 271 and 275 (clutches disengaged) when the third stationing switch 62 was tripped. Upon energizing the reversing solenoid, the program box deenergizes solenoids 181 to 185 by way of line 271, thus engaging the clutches of the one-inch and decimal selector switches. However, the forward solenoid 180 of the ten-inch selector remains energized (clutch disengaged) by line 275 from the program box at this time, hence its selector switch remains in the zero position. Continued operation of the dial motor now drives the brushes of the one-inch and decimal selectors in the direction indicated by the broken lines.

The brushes 234 of the selector switches are connected to the program box by the respective lines 244 indicated earlier in Figure 26. As the brushes reach the selected contacts which are energized, for example the "7" contact of the one-inch switch, the circuit is completed from the reader lines 240, through the brushes and contacts to the respective lines 244. As each line is energized, the program box energizes the solenoid for that particular selector switch, thus disengaging the clutches and stopping the brushes and dials in the preselected positions indicated by the broken line arrows.

After the solenoid 181 of the one-inch selector is energized by way of its line 271, the control box deenergizes line 275 which leads to the forward clutch solenoid 180 of the ten-inch selector switch, thus engaging the forward ten-inch clutch. Gear 163 and its brush are now rotated from zero in the forward direction, as indicated by the arrow in dotted lines, until the brush contacts the "3" contact. At this point, the circuit is completed from the program reader (lines 263) through the brush to line 276 leading to the program box. Upon being energized by line 276, the program box energizes the line 275 which leads to the forward ten-inch clutch solenoid 180, causing the clutch to be disengaged. All of the selector switches and associated dials are now in the signalled position with the measuring rods in the gauging positions as shown in Figure 3.

Line 276 also causes the program box to deenergize the dial motor 186 after a short delay following disengagement of the ten-inch clutch. The apparatus is now ready to initiate the positioning cycle. For this purpose, a line 277 extends from the program box to the positioning box. This line is energized by the program box when the dial motor 186 is deenergized, the circuit being completed by line 267 to start the cycle. The program box also deenergizes all of the clutch solenoids at this point.

As disclosed in the aforesaid Patent No. 2,674,706, the positioning cycle is initiated when the operator depresses a starting switch indicated at 57 in Figures 1 and 26. When the starting switch is depressed, the control circuit of the positioning apparatus first energizes the traverse motor in a direction to shift the table toward the right at a traverse rate, then to deenergize the traverse motor and energize the positioning motor to inch the table to its final position under the control of feeler rod 33. The positioning apparatus operates in the same manner under control of the programing circuit, that is, the line 277 signals the positioning circuit, the cycle thereafter being under control of the positioning apparatus.

It will be understood that the programing apparatus for the saddle is identical to the table mechanism described above. In this case, the saddle is shifted outwardly at the start of the cycle, then the dials of the saddle dial housing 26 are selected by the selector mechanism 27 as previously noted. When both the saddle and table have been positioned, the point on the work is precisely located in alignment with the drill spindle.

The programing circuits of the table and slide may be interconnected with the control system of the drill head motor to initiate the boring operation and also to select the feed rate and spindle speed in accordance with the drill diameter and other variable factors. This apparatus has been omitted since it is not essential to the invention.

After the first hole has been bored, and the spindle has been retracted, the operator again depresses the cycle switch 260 to position for the next hole. This location may be either to the right or left of the hole previously bored, depending upon the data which is fed into the program reader.

In the preferred mode of operation, all of the holes are located in a given direction from a single reference point to eliminate the build-up of tolerance from hole to hole. According to this procedure, the dimensions, which are fed into the reader, cause each successive hole to be located from the zero reference point previously established (Figure 2). By way of example, if the reader should signal the dimension 31.9625", the program box will run the apparatus through the same sequence, first backing the table to a position to trip the number three stationing switch 62, then the ten-inch dial will be rotated to its zero position and the unit dial will be rotated to its "1" position. Since the decimal dimension (.9625) remains the same, the brushes of these switches continue to energize the corresponding solenoids, causing these dials to remain stationary. After the positioning cycle is completed, the table will be positioned to locate the second hole. In this example, the second hole would be located 6.0000" to the left of the first hole, since the second measurement is shorter by that distance. On the other hand, if the next dimension is greater than the first one, then the next hole will be located in the same manner but at a corresponding distance to the right of the previously bored hole.

In the event that the hole position is less than one-inch from the zero table position, then the first stationing switch 66 (0–9) will be energized, causing the table to traverse to the left to trip the first stationing switch and at this point, the table will stop. The circuit will then be set up to rotate the dials to the positions signalled by the reader, the ten-inch and one-inch dials being rotated to zero. Accordingly, the ten-inch and one-inch dials are inactive and the decimal dials provide the selected decimal measurement. After the dials are set, the positioning cycle is initiated as outlined above.

It will be noted that the first stationing switch 66 is connected to the zero contact of the ten-inch selector switch. This stationing switch is located to the left a sufficient distance to allow the nine-inch rod of the turret to be rotated to measuring position when the table reaches its back-up position to trip this switch. Thus, even if no ten-inch dimension is required, the back-up position always accommodates the longest rod of the turret. The remaining stationing switches 60 to 63 are located at spacing to be tripped when the table reaches positions to accommodate the first, second, third or fourth ten-inch rods respectively. In each case, the slight over-travel 50 is created so that clearance exists between the selected ten-inch rod and the adjacent end of the turret rod which is to contact the selected ten-inch rod. This clearance is of course taken up at the start of the positioning cycle.

As described with reference to the selector mechanism, the clutch spools 196 are urged constantly in engaging direction by the spring 211. When the drive collars 202 are rotated to drive the clutches and gears (with the clutch solenoids deenergized), the ends of the pins ride upon the face of each collar until the slot 204 rotates into alignment with the pins at which point the pins snap into the slots. Aftfer this positive driving connection is established, each brush advances from contact to contact until it reaches the one which is energized, at which point its solenoid is energized to disengage the clutch. It will be seen therefore, that each selector switch operates independently in hunting its energized contact and that the digit selections are made in a positive manner. It will also be noted that the notches 87 of the dial detent rings are related in position to the contacts, such that the detent rollers hold the dials and gears in the selected positions after the clutches are disengaged.

The program box is also provided with a manually operated stop switch indicated at 278. The stop switch is interconnected in the program circuit to allow the operator to decommission the apparatus in the event of emergency. A line 280 leads from the program box to the positioning box, such that the traverse and positioning motors are brought to a stop with the programing apparatus when the stop button is depressed.

The program box also includes a manual switch 281 which decommissions the entire circuit, upon being depressed, to allow the dials to be set by hand at the dial box as indicated earlier. The control circuit of the positioning apparatus is provided with the manually operated switches 55 to 58 for manual control, as explained previously. When the programing apparatus is set for manual operation, the table (or saddle) may be traversed manually to the required zero and back-off positions and, after setting the dials, the positioning cycle is initiated by depressing the button 260 of the positioning control box.

Having described my invention, I claim:

1. A programing apparatus for a machine tool, said machine tool having a base member, a slide member carried by the base member for lineal motion thereon, said slide member having reversible power means connected therewith for shifting the same in a forward direction, said slide member residing in a retracted back-off position at the start of a programing cycle, said programing apparatus comprising a plurality of shiftable measuring rods providing additive lineal measurements, an electrically operated selector mechanism connected to said measuring rods for shifting the same to an active measuring position in axial alignment with one another, said programing apparatus generating an electrical measurement signal in accordance with dimensional data which is fed therein, said programing apparatus including means for initiating a measurement selection cycle, said programing apparatus electrically connected to the selector mechanism and energizing the same to shift the measuring rods in a single direction to said active measuring position in response to the said electrical measurement signal a plurality of stationary contacts, a movable brush element in driving connection with the measuring rods adapted to traverse said contacts, said contacts being interconnected with the programing apparatus for energization in accordance with said measurement signal, means energized by said contacts for stopping said measuring rods in said active measuring position, said rods thereby providing a lineal measurement corresponding to the said signal, said programing apparatus electrically connected to said power means and energizing the same for shifting the slide member in a forward direction after said measuring elements are shifted to said active position, an abutment carried by the slide member for movement into contact with the axially aligned measuring rods, and a feeler element carried by the base member and aligned with the opposite end of the aligned rods for contact thereby, said feeler element being electrically interconnected with the said reversible means and deenergizing the same upon being contacted by said rods under predetermined pressure, said measuring rods being shiftable endwisely upon being contacted by the thrust element to stop the slide member at a selected position along the base member upon being shifted endwisely into contact with the feeler element.

2. A programing apparatus for a machine tool having a base, a slide member mounted on said base, for lineal motion in forward and reverse directions, an automatic positioning apparatus connected to the slide member for shifting the same in said forward or reverse directions, and a plurality of rotatatble measurement selector dials which shift a plurality of measuring rods to a measuring position in abutment between said slide member and automatic positioning apparatus, said programing apparatus including a plurality of rotatable dial-setting gears in driving connection with said measuring dials, one for each dial, a plurality of stationing devices mounted relative to the slide member in positions to be tripped by the slide member upon motion thereof in said reverse direction at selected back-off positions, a programing control circuit including an automatic reading device which provides electrical measurement signals in accordance with dimensional data carried upon a record sheet which is fed therein, said programing circuit being electrically connected with said stationing devices and with said automatic positioning apparatus, said programing circuit energizing said automatic positioning apparatus for driving the slide member in said reverse direction and energizing a stationing device which provides reverse back-off movement of the slide member sufficient to shift the measuring rods between the slide member and positioning apparatus in accordance with the measurement signal provided by the reading device, said stationing device upon being tripped deenergizing said positioning apparatus and stopping the slide member at said back-off position, the programing circuit thereupon rotating said dial setting gears, respective stationary and movable contacts in driving connection with said dial-setting gears and relatively engageable during rotation thereof, said contacts electrically interconnected with the programing circuit, and electrically operated coupling means connected to said contacts and adapted to stop said dial-setting gears in the positions corresponding to the measurement signal, the programing circuit thereafter initiating the positioning cycle, thereby causing the positioning apparatus to shift the slide member in forward direction and into abutting relationship with the selected measuring rods, thereby locating the slide member in a position corresponding to said measurement signal.

3. A programing apparatus for a machine tool, said machine tool having a base member, a slide member carried by the base member for lineal motion thereon, said programing apparatus comprising respective groups of shiftable measuring elements providing selected lineal measurements, respective shiftable actuating devices mechanically connected to said groups of measuring elements for shifting the same to an active measuring position, said programing apparatus generating an electrical measurement signal in response to dimensional data which is fed therein, each of said actuating devices including a group of contacts which correspond to the measurements of the group of measuring elements to which the actuating device is connected, said programing apparatus electrically connected to the respective contacts of each actuating device and energizing one contact of each group which corresponds to the measurement signal generated by the programing apparatus, each of said actuating devices having a brush element which sequentially engages said contacts upon shifting motion of the said actuating devices, said brush elements electrically connected to the programing apparatus, said programing apparatus decommissioning the respective actuating devices when the brush element thereof engages the energized contact thereof, thereby to shift the selected measuring element of each group to said active position, said selected measuring elements being effective to locate the slide member in a selected position along the base member according to said dimensional data.

4. A programing apparatus for a machine tool, said machine tool having a base member, a slide member carried by the base member for lineal motion thereon, said programing apparatus comprising a plurality of shiftable measuring elements providing selected lineal measurements, a respective actuating device mechanically connected to each measuring element for shifting the same to an active position, a selector motor, electrically operated coupling devices connecting said actuating devices to said motor for shifting the actuating device and associated measuring elements to said active positions, said programing apparatus generating an electrical measurement signal in response to dimensional data which is fed therein, each of said actuating devices including contacts which correspond to the measurements of the group of measuring elements to which the actuating device is connected, said programing apparatus electrically connected to said respective contacts and completing a circuit to one contact of each actuating device which corresponds to the said electrical measurement signal, each of said actuating devices having a brush element which sequentially engages said contacts upon shifting motion of the said actuating devices, said brush elements electrically connected to the programing apparatus, said programing apparatus connected to said electrically operated coupling devices and uncoupling the same individually from the respective actuating devices when the brush element thereof engages the contact which corresponds to the said electrical measurement signal, thereby to shift a selected measuring element of each group to said active position, said measuring elements in active position being effective to locate the slide member in a position relation to the base member which corresponds to said dimensional data.

5. In a programing apparatus for a machine tool having a base member, a slide member mounted on the base member for lineal movement thereon, said machine tool having a plurality of dials which control the movement of said slide member with respect to the base member upon rotation of the dials to selected measuring positions, said programing apparatus including a reading device which produces electrical measurement signals, a plurality of dial-setting gears in driving connection with said dials for rotating the same to selected measuring positions, respective electrically controlled devices rotating the dial-setting gears to said selected positions, a plurality of electrical contacts for each of said dial-setting gears, the contacts of each gear corresponding to the measuring positions of the dial which is driven by said gear, and a brush element mounted upon each of said dial-setting gears and traversing said contacts during rotation thereof, said reading device energizing a selected contact of each gear in accordance with a position to which the dial thereof is to be rotated, said electrically controlled devices stopping the rotation of the gears upon rotation of the gears and the dials thereof to a position in which the said brush element completes a circuit with the contact which is energized by the reading device.

6. In a programing apparatus for a machine tool having a base member, a second member mounted on the base member for lineal movement thereon, said machine tool having a plurality of dials which control the movement of said second member with respect to the base upon rotation of the dials to selected measuring positions, said programing apparatus including a reading device which produces electrical measurement signals, a plurality of dial-setting gears in driving connection with said dials for rotating the same to selected measuring positions, respective electrically controlled clutches in driving engagement with said dial setting gears, a dial driving motor in driving connection with said clutches and rotating said gears through said clutch, a plurality of electrical contacts for each of said dial-setting gears, said contacts corresponding to the measuring positions of the dial which is driven by each gear, a brush element mounted upon each of said gears traversing said contacts, said programing apparatus energizing a selected contact of each gear in accordance with a position to which the dial is to be rotated, said programing apparatus completing a circuit from said brush element to each of said electrically operated clutches and shifting said clutches to a disengaged position when the brush elements traverse the said energizing contacts, said clutch elements thereby stopping the dial-setting gears and dials in measuring positions in accordance with said electrical measurement signals.

7. In a programing apparatus for a machine tool having a base, a slide member mounted on the base, an automatic positioning apparatus in driving connection with the slide for shifting the same in forward and reverse directions, and a measuring apparatus including a plurality of rotatable dials, said measuring apparatus interconnected with said positioning apparatus and regulating the position of the slide member, said programing apparatus including a plurality of dial-setting elements in driving connection with the respective dials of the measuring apparatus, a plurality of stationing switches mounted relative to the slide member and spaced from one another, said stationing switches being tripped by the slide member upon reverse motion thereof to a back-off position, said programing apparatus generating electrical measurement signals in response to dimensional data which is fed therein, said apparatus in electrical connection with said dial-setting elements for shifting said elements and dials, relatively engageable stationary and movable contacts in driving connection with said dial-setting elements and electrically connected to the programing apparatus to receive said measurement signals, electrical coupling means interposed in the dial-setting elements and electrically connected to said relatively stationary and movable contacts and adapted to stop said dial-setting elements in positions corresponding to the electrical measurement signals, said program apparatus interconnected with said stationing switches and energizing the same in accordance with the said electrical measurement signals, said programing apparatus interconnected with said automatic positioning apparatus and energizing the same to cause reverse movement of the slide element, said positioning apparatus stopping the slide member when the energized stationing switch is tripped by said slide member, said programing apparatus shifting said dial-setting elements in response to the tripping of said stationing switch and thereupon rotating the dials to a dimension which corresponds to said electrical measurement signal, said programing apparatus thereafter initiating a positioning cycle, whereby the positioning apparatus advances the slide member forwardly to a position which is controlled by the measuring apparatus in accordance with the setting of said dials.

8. In a programing apparatus for operating a plurality of rotatable measuring dials, each having a plurality of measuring positions, said positioning apparatus including a series of dial-setting gears in driving connection with the respective measuring dials, said gears mounted for rotation relative to one another, a common drive shaft for rotating said dial setting gears, a dial drive motor in driving connection with said shaft, a respective electrically operated coupling device providing a driving connection from said shaft to each of said dial setting gears, a rotatable selector switch in driving connection with each dial setting gear, each selector switch having a series of electrical contacts corresponding to the measuring positions of the dials, each switch serially closing said contacts upon rotation of the switch, a reading device which generates electrical signals in accordance with a measurement record which is fed therein, said reading device electrically connected to the electrical contacts of each selector switch and energizing a selected contact of each switch which corresponds to the measurement record which is fed into the reading device, said switch completing a circuit to the respective electrically operated coupling device of each dial-setting gear upon rotation of the gear and switch to a position closing the said energized contacts, said switch thereby energizing said coupling device selectively, said coupling devices upon being energized uncoupling the respective dial-setting gears from said drive shaft and thereby stopping the dial-setting gears and measuring dials in the position which corresponds to the said electrical measurement signal.

9. In a programing apparatus for operating a plurality of rotatable measuring dials, each having a plurality of measuring positions, said programing apparatus having a respective dial-setting gear in driving connection with each of said measuring dials, said gears mounted for rotation relative to one another, to a plurality of measuring positions, a respective pinion meshing with each of said dial-setting gears, a respective rotatable selector switch in driving connection with each of said dial-setting gears, each of said switches having a plurality of electrical contacts corresponding to the plurality of measuring positions of said dials, said switches serially closing said contacts upon rotation thereof, a reading device which generates electrical measurement signals in response to a recorded measurement record which is fed therein, said reading device electrically connected with said respective contacts and energizing one of said contacts of each switch in accordance with the said electrical measurement signal, a shiftable electrically operated coupling device driving each of said pinions during measurement selection, said selector switches electrically connected to the electrical coupling devices and energizing the same upon rotation of the dial-setting gear to a position closing the energizing contact thereof, said electrically operated coupling devices thereupon uncoupling the pinions and stopping the dial-setting gears in dials in positions corresponding to said electrical measurement signal.

10. In a programing apparatus for operating a plurality of rotatable measuring dials, each having a plurality of measuring positions, at least one of said dials constituting a multiple unit dial and being limited to less than one revolution, said multiple dial being reset to a given starting position prior to being rotated in a forward direction to a measuring position, said programing apparatus having a plurality of dial-setting gears in driving connection with the respective measuring dials, said gears mounted for rotation relative to one another, one of said gears being in driving connection with said multiple dial, an electrically operated forward driving device in driving connection with each of said dial-setting gears, said driving devices driving said gears in a forward direction, a reverse driving device in driving connection with the gear which drives said multiple dial, said programing apparatus electrically connected with said respective driving devices, said programing apparatus generating electrical measurement signals in response to a measurement record which is fed therein, means in said programing apparatus for initiating a cycle of operation, said programing apparatus energizing said reverse driving device at the start of said cycle and driving the dial-setting gear of said multiple dial in reverse direction, means in said programing apparatus decommissioning the same upon rotation of said multiple dial to said given starting position, said programing apparatus thereafter energizing the forward driving devices of said dial-setting gears, said forward driving devices rotating said gears and dials in a forward direction to selected measurement positions corresponding to the said electrical measurement signal.

11. In a programing apparatus for operating a plurality of rotatable measuring dials, each having a plurality of measuring positions, at least one of said dials constituting a multiple unit dial and being limited to less than one revolution, said multiple dial being reset to a given starting position prior to being rotated in a forward direction to a measuring position, said programing apparatus having a plurality of dial-setting gears in driving connection with the respective measuring dials, said gears mounted for rotation relative to one another, one of said gears being in driving connection with said multiple dial, an electrically controlled forward driving device in driving connection with each of said dial-setting gears, said driving devices driving said gears in a forward direction, a reverse driving device in driving connection with the dial-setting gear which drives said multiple dial, said programing apparatus electrically connected with said respective driving devices, said programing apparatus generating electrical measurement signals in response to a measurement record which is fed therein, a respective rotatable selector switch in driving connection with each of said dial-setting gears, said switches including electrical contacts corresponding to the measuring positions of said dials, said programing apparatus energizing one contact of each switch which corresponds to the measurement record fed therein, said switches traversing said contacts and being in electrical connection with the said electrically controlled driving devices and effective to decommission the same when the switches traverse said energized contacts during rotation of the dial-setting gears in said forward direction, means in said programing apparatus for initiating a cycle of operation, said programing apparatus energizing said reverse driving device at the start of said cycle and driving the dial-setting gear of said multiple dial in reverse direction, means in said programing apparatus decommissioning said reverse device upon rotation thereof to said given starting position, said programing apparatus thereafter energizing the forward driving devices, whereby said dials are rotated in a forward direction to the energized contact of said selector switches decommissioning the driving devices upon rotation of the gears and dials in said forward direction traversing the energized contact of each switch.

12. In a programming apparatus for operating a plurality of rotatable length measuring dials, each having a plurality of measuring positions, one of said dials constituting a multiple measurement dial and being rotatable through less than one complete revolution, said multiple dial being rotated in a reverse direction to a given starting position at the start of a measurement selection, said programing apparatus having a series of dial-setting gears in driving connection with the respective measuring dials, said dial-setting gears rotatably mounted upon a common driven shaft for rotation relative to one another, the gear which drives said multiple dial being keyed to said shaft, a respective pinion meshing with each of said dial-setting gears, said pinions being rotatably mounted upon a common drive shaft, motor means rotating said common drive shaft during a measurement cycle, a respective electrically operated clutch normally connecting said pinions to said common drive shaft, said clutches disengaging said pinions upon being energized, a reverse idler gear meshing with one of said pinions, a gear keyed to the common shaft of the dial-setting gears and in mesh with said reverse idler gear, the programing apparatus including means for initiating a selecting cycle, said apparatus connected with said electrically operated clutches and engaging the clutch which drives said reverse idler at the start of a cycle, said apparatus disengaging the remaining clutches of the cycle, whereby said common driven shaft is rotated in a direction to rotate the multiple dial-setting gear in reverse direction, the programing apparatus disengaging said clutch upon rotation of multiple dial to a position which corresponds to the said given starting position, the programing apparatus thereafter engaging the remaining clutches and thereby rotating the dial-setting gears and dials in a forward direction, said programing apparatus disengaging all of said clutches upon rotation of the dial-setting gears and dials to preselected measuring positions.

13. An electromechanical system for translating coded numerical data into a physical length measurement comprising, movable matrix members respectively containing measuring rods varying uniformly by increments of length in respective tenths, hundredths, and thousandths of units of measurement, means including emitters respectively coupled to said matrix members for moving the same serially past an axis of alignment in which measuring rods contained in the respective matrix members are engageable in end-to-end relation, power means including normally engaged clutches individual to said emitters, said engaged clutches establishing positive driving connection with the emitters for moving said emitters in unison, relatively stationary and movable contacts in said emitters, said contacts being serially engaged during the shifting motion of the matrix member relative to said axis of alignment, means for applying electrical measurement signals to said contacts, and electrical power means electrically connected to said contacts and mechanically connected to said clutches for respectively disengaging said clutches whereby, as each emitter is declutched, a measuring rod carried by the matrix and conforming to a portion of the coded information stops at the said axis of alignment and thereby is additively engageable by measuring rods carried by adjacent matrices, conforming to other portions of the coded information and similarly stopped at the said axis of alignment, and the total length of the additively engageable measuring rods of the matrices conforming to the total of the coded information, constitutes a physically measureable dimension.

14. An electromechanical system for translating coded numerical data into a physical length measurement comprising, movable matrix members respectively containing sets of measuring rods varying uniformly by increments of length in respective units, and tenths, hundredths, and thousandths of units of measurement, means including emitters respectively coupled to said matrix members for moving the same past an axis of alignment in which measuring rods contained in the respective matrix members are engageable in end-to-end relation, said emitters comprising rotatable switches having normally deenergized taps thereon corresponding to increments of variation in each of the units, and tenths, hundredths, and thousandths of units of measurement, power means including normally engaged clutches individual to said emitters for rotating said emitters in unison, decoding means electro-responsive to coded information for energizing a tap of each emitter in accordance with the code information, a brush element in said emitter traversing said taps during rotation of the emitter, and electrical actuating means electrically connected to said taps for effecting declutching of said emitters respectively through the energized taps thereof whereby each emitter, when declutched according to the code information, causes the matrix driven thereby to stop in a position at which a measuring rod of value corresponding to the code information rests at the said axis of alignment in which the measuring rods of the respective matrices are engageable in end-to-end relation.

15. An electromechanical system for translating coded numerical data into a physical length measurement comprising, movable matrix members respectively containing sets of measuring rods varying uniformly by increments of length in respective units, and tenths, hundredths, thousandths, and ten-thousandths of units of measurement, means including emitters respectively coupled to said matrix members for moving the same past an axis of alignment in which measuring rods contained in the respective matrix members are engageable in end-to-end relation, said emitters comprising shiftable electrical switches having taps thereon corresponding to increments of variation in each of the units, and tenths, hundredths, thousandths, and ten-thousandths of units of measurement, power means including normally engaged clutches individual to said switches for shifting the same, decoding means electro-responsive to coded information for energizing a tap of each switch in accordance with the code information, a brush element in said emitter traversing said taps during rotation thereof, and electrical actuating means electrically connected to said taps for declutching said emitters respectively through the energized taps thereof, whereby each switch when declutched according to the code information, causes the matrix driven thereby to stop in a position at which a measuring rod of value corresponding to the code information resides at the said axis of alignment in which the measuring rods of the respective matrices are engageable in end-to-end relation.

16. An electromechanical system for translating coded numerical data into a physical length measurement comprising, movable matrix members respectively containing measuring rods varying in length dimension, means including emitters respectively coupled to said matrix members for moving the same serially past an axis of alignment in which measuring rods contained in the respective matrix members are engageable in end-to-end relation, power means including normally engaged clutches individual to said emitters, said engaged clutches establishing positive driving connection with the emitters for moving said emitters in unison, said emitters having relatively stationary and movable contacts, said contacts being serially engaged during the shifting motion of the matrix members relative to said axis of alignment, and means for applying electrical measurement signals to said contacts, and electrical actuating means electrically connected to said contacts respectively disengaging said clutches, whereby as each emitter is declutched, a measuring rod carried by the matrix and conforming in length dimension to a portion of the coded information stops at the said axis of alignment and thereby is additively engageable by measuring rods carried by adjacent matrices, conforming to other portions of the coded information and similarly stopped at the said axis of alignment, and the total length of the additively engageable measuring rods of the matrices conforming to the total of the coded information, constitutes a physically measureable dimension.

17. An electromechanical system for translating coded numerical data into a physical length measurement comprising, movable matrix members respectively containing sets of measuring rods varying in length dimension, means including emitters respectively coupled to said matrix members for moving the same past an axis of alignment in which measuring rods contained in the respective matrix members are engageable in end-to-end relation, said emitters comprising rotatable switches having normally deenergized taps thereon corresponding to the varying length dimension of the set of measuring rods of the matrix to which the rotatable switch is coupled, power means including normally engaged clutches individual to said switches for rotating said switches, decoding means electro-responsive to coded information for energizing a tap of each switch in accordance with the code information, a brush element in said emitter traversing said taps during rotation thereof, and respective electrical actuating means electrically connected to said brushes and mechanically connected to said clutches for disengaging said clutches respectively through the energized tap of each switch, whereby each switch, when declutched according to the code information, causes the matrix driven thereby to stop in a position at which a measuring rod of a length corresponding to the code information rests at the said axis of alignment in which the measuring rods of the respective matrices are engageable in end-to-end relation.

18. A device for converting coded data which stores a multi-digit number to a length corresponding to said multi-digit number, said device comprising a plurality of movable matrix members, a plurality of measuring rods carried by each of said matrix members, one of said matrix members corresponding to the decade associated with each digit, the rods carried by each matrix varying uniformly in length, and corresponding to decade digits, driving means for moving each of said matrix members to shift the rods carried by the matrix into registry with an axis of alignment along which rods are engageable in endwise abutment, a decade switch shiftable with each of said matrices, means for energizing each decade switch in accordance with the corresponding digit stored by the coded data, said decade switch having relatively stationary and movable contacts engageable serially during the shifting motion of the switch, said contacts corresponding to the multi-digit number, a clutch element electrically interconnected with said contacts and adapted to be disengaged by said stationary and movable contacts during relative motion thereof, said clutch being effective to control said driving means to position the matrix controlled thereby in accordance with the corresponding digit stored by said coded data, the rods carried by said matrices and in registry with said axis of alignment being engageable end to end and having a total length corresponding to the multi-digit number.

19. A machine tool including a tool slide mounting a cutting tool, means for shifting said slide to a selected point, said means comprising an electrical motor in driving relationship with said slide, a device for converting coded data which stores a multi-digit number to a length corresponding to said multi-digit number, said device comprising a plurality of movable matrix members, a plurality of measuring rods carried by each of said matrix members, one of said matrix members corresponding to the decade associated with each digit, the rods carried by each matrix varying uniformly in length, and corresponding to decade digits, driving means for moving each of said matrix members to shift the rods carried by the matrix into registry with an axis of alignment along which rods are engageable in endwise abutment, a decade switch shiftable with each of said matrices, means for energizing each decade switch in accordance with the corresponding digit stored by the coded data, said decade switch having contacts which are closed serially as said switch is shifted with said matrix member, and electrically operated clutch elements in said driving means for controlling the same, said clutches being electrically connected to said contacts to be energized thereby, said clutches being effective to control said driving means to position the matrix controlled thereby in accordance with the corresponding digit stored by said coded data, the rods carried by said matrices and in registry with said axis of alignment being engageable end to end and having a total length corresponding to the multi-digit number, abutment switch means shiftable with said slide and adapted for engagement with one end of said rods, said abutment switch means being in circuit controlling relationship with said electrical motor.

20. A machine tool including a tool slide mounting a cutting tool, means for shifting said slide to a selected point, said means comprising an electrical motor in driving relationship with said slide, a device for converting coded data which stores a multi-digit number to a length corresponding to said multi-digit number, said device comprising a plurality of movable matrix members, a plurality of measuring rods carried by each of said matrix members, one of said matrix members corresponding to the decade associated with each digit, the rods carried by each matrix varying uniformly in length, and corresponding to decade digits, driving means for moving each of said matrix members to shift the rods carried by the matrix into registry with an axis of alignment along which rods are engageable in endwise abutment, a decade switch shiftable with each of said matrices, said decade switch having contacts which are closed in accordance with the shifting of the decade switch, means for energizing one of said contacts in accordance with the coded data, an electrically operated coupling element interposed in the driving means of the matrix members, said coupling element interconnected with said contacts and adapted to be electrically disengaged by the contacts during the shifting motion of the decade switch, said coupling element being effective to position the matrix controlled thereby in accordance with the corresponding digit stored by said coded data, the rods carried by said matrices and in registry with said axis of alignment being engageable end to end and having a total length corresponding to the multi-digit number, abutment switch means shiftable with said slide and adapted for engagement with one end of said rods, said abutment switch means being in circuit controlling relationship with said electrical motor, and back-off means for initially shifting said slide to a position spaced from said selected point, said back-off means including an element responsive to said coded data for spacing said slide a predetermined distance from said selected point.

References Cited in the file of this patent

UNITED STATES PATENTS

| | | |
|---|---|---|
| 2,674,706 | Knosp | Apr. 6, 1954 |
| 2,710,934 | Senn | June 14, 1955 |
| 2,832,023 | Gough | Apr. 22, 1958 |

FOREIGN PATENTS

| | | |
|---|---|---|
| 767,539 | Great Britain | Feb. 6, 1957 |
| 1,112,168 | France | Nov. 9, 1955 |